United States Patent
Gwon et al.

(10) Patent No.: US 7,257,411 B2
(45) Date of Patent: Aug. 14, 2007

(54) SELECTIVE FUSION LOCATION ESTIMATION (SELFLOC) FOR WIRELESS ACCESS TECHNOLOGIES

(75) Inventors: Youngjune Lee Gwon, Mountain View, CA (US); Ravi Kumar Jain, Mountain View, CA (US); Toshiro Kawahara, Saratoga, CA (US)

(73) Assignee: NTT DoCoMo, Inc., Tokyo (JP)

( * ) Notice: Subject to any disclaimer, the term of this patent is extended or adjusted under 35 U.S.C. 154(b) by 370 days.

(21) Appl. No.: 10/330,523

(22) Filed: Dec. 27, 2002

(65) Prior Publication Data

US 2004/0203904 A1 Oct. 14, 2004

(51) Int. Cl.
*H04B 7/20* (2006.01)

(52) U.S. Cl. .............. 455/456.1; 455/456.2; 455/456.3; 455/115.1; 455/115.3; 455/226.1

(58) Field of Classification Search .......... 455/456.1, 455/457, 404.2, 414.2, 421, 456.2, 115.1, 455/115.3, 226.2
See application file for complete search history.

(56) References Cited

U.S. PATENT DOCUMENTS

| | | | |
|---|---|---|---|
| 6,438,380 B1 * | 8/2002 | Bi et al. ................ | 455/456.1 |
| 6,801,782 B2 * | 10/2004 | McCrady et al. .......... | 455/517 |
| 2002/0005804 A1 * | 1/2002 | Suprunov .................. | 342/457 |
| 2002/0094825 A1 * | 7/2002 | Endo et al. ................ | 455/456 |
| 2002/0115448 A1 * | 8/2002 | Amerga et al. ............ | 455/456 |
| 2002/0196188 A1 * | 12/2002 | Holt ........................... | 342/453 |
| 2003/0083076 A1 * | 5/2003 | Pradhan et al. ............ | 455/456 |
| 2003/0087647 A1 * | 5/2003 | Hurst ......................... | 455/456 |
| 2003/0129992 A1 * | 7/2003 | Koorapaty et al. ........ | 455/456 |
| 2004/0075606 A1 * | 4/2004 | Laiho et al. ............... | 342/357.1 |
| 2004/0142660 A1 * | 7/2004 | Churan ...................... | 455/12.1 |

OTHER PUBLICATIONS

P. Bahl and V. N. Padmanabhan, "RADAR: An In-building RF-based User Location and Tracking System," IEEE Infocom 2000, Mar. 2000, Tel Aviv, Israel.
P. Castro, et al., "A Probabilstic Location Service for Wireless Network Environments," Ubiquitos Computing 2001, Sep. 2001, Atlanta, Georgia.
A. M. Ladd, et al., "Robotics-Based Location Sensing using Wireless Ethernet," MOBICOM '02, Sep. 2002, Atlanta, Georgia.
B. Widrow and S. D. Stearns, *Adaptive Signal Processing*, Prentice Hall Inc., 1985, pp. 15-24, Upper Saddle River, New Jersey.

* cited by examiner

*Primary Examiner*—Duc M. Nguyen
*Assistant Examiner*—Dai Phuong
(74) *Attorney, Agent, or Firm*—Edward C. Kwok; MacPherson Kwok Chen & Heid LLP

(57) ABSTRACT

In an RF environment serviced by 802.11, Bluetooth(™), or other network transmitters, or combinations, location-estimation methods and systems can advantageously use redundancy to refine an estimated location of an RF receiver. In one embodiment, a method for finding a receiver's location includes receiving signals from fixed transmitters, calculating preliminary location estimates, and combining the estimates using predetermined reference information on the RF environment. The reference information preferably includes minimum mean-squared error optimizing coefficients.

24 Claims, 10 Drawing Sheets

SELECTIVE FUSION LOCATION ESTIMATION (SELFLOC) FOR WIRELESS ACCESS TECHNOLOGIES

BACKGROUND

The invention relates generally to wireless communications and more specifically to techniques for determining the location of a mobile receiver in a wireless communications system.

Cellular telephones, portable computers, and other portable communications units benefit from the ability to independently determine their location. Most techniques for locating wireless receivers are directed at outdoor environments, such as for cellular telephones and vehicle-mounted receivers. However, some research has been directed toward creating separate indoor sensor networks for indoor positioning. A primary initiative for these efforts is the fact that low earth orbit (LEO) based Global Positioning System (GPS) has poor indoor coverage. Similar efforts have studied local wireless area network infrastructures that can be used for indoor location estimation by leveraging the information obtained via received wireless beacon signals.

In the case of cellular telephones, the ability to determine at least a rough location is a necessary one, so that handoffs can be made as the handheld unit moves from cell to cell. For similar reasons, portable computers connected to a network have an increasing need for the ability to estimate their locations in real time. For example, it would be helpful for a portable computer connected to a building's wireless network to be able to determine accurately its own location. Thus, it could determine which wireless access point is closest, thereby allowing for more robust connectivity to the wireless network. In other applications, portable computers, personal digital assistants, cordless telephones, cellular telephones, and other portable network devices would benefit from the ability to provide accurate location information to a user and to applications that can use the real-time information.

BRIEF SUMMARY

Described herein are methods and devices for determining the location of a wireless receiver during operation of the receiver. In one embodiment, a method for fixing the receiver's location starts with a receiver receiving RF signals from transmitters fixed in a number of base units. It includes analyzing the received signals and using them to estimate the location of the receiver.

More than one calculation is made of the receiver's estimated location. The resulting collection of estimated locations is then combined together to generate a composite estimated location or a refined estimated location. In one embodiment of the method, the techniques of two or more of: triangulation, smallest polygon, or k-nearest neighbors are used to generate location estimates.

In another embodiment of the method, various location estimates are generated by collecting data from different subsets of transmitters and combining them in a weighted average to create an enhanced triangulation calculation.

In yet a further embodiment of the method, various location estimates are generated by finding a set of nearest-neighboring test points, and then combining these points to create an enhanced k-nearest neighbors calculation.

In still a further embodiment of the method, various location estimates are generated by finding a set of best-matching test points, and then combining these points to create an enhanced smallest-polygon calculation.

The combination of the estimated locations is preferably done as a weighted average, with the weighting coefficients optimized to reduce the expected error of the refined location. The method preferably concludes with using the weighted average as the location of the wireless receiver.

One method for optimizing weighting coefficients for use in determining a receiver's location involves analyzing the operating region and developing the coefficients in response to the static environment of the receiver's operating area. The coefficients are preferably optimized through a feedback process and/or a minimum mean square error (MMSE) calculation.

BRIEF DESCRIPTION OF SEVERAL VIEWS OF THE DRAWINGS

Other objects and advantages of the invention will become apparent upon reading the following detailed description and upon reference to the accompanying drawings.

DETAILED DESCRIPTION OF THE PRESENTLY PREFERRED EMBODIMENTS

1. Introduction

Mobile communications systems are increasingly expected to simultaneously use a variety of wireless access technologies. Today's mobile devices are often equipped with multiple wireless interfaces for connecting to different forms of wireless networks, such as high-bandwidth cellular connections (eg.: 3G modems), wireless Ethernet ports (eg.: IEEE 802.11), and short-distance peripheral connectors (eg.: Bluetooth ports(™)). The proliferation of these multi-interface embedded mobile devices offers a number of opportunities in mobile business and technical research. In many settings, this heterogeneous wireless networking is deployed and available to be used for new applications. Since some users already demand the versatility of communicating over a variety of different networks, new applications can readily exploit the availability of the multiple networks. One application that can benefit from the heterogeneous wireless networks is location estimation—the ability of a mobile unit to accurately determine its own physical location.

The prominent growth of interest in location-aware systems and services drives the need for better location estimation techniques. This disclosure introduces Selective Fusion Location Estimator (SELFLOC), a collection of techniques and devices that enable a mobile unit to estimate its position. These tools allow the unit to selectively combine multiple sources of information and multiple estimation techniques in homogenous and heterogeneous wireless environments. These tools are particularly valuable for indoor applications, where heterogeneous wireless networks are more prominent. They are also readily applicable to outdoor deployment, in situations where heterogeneous networks or redundant base units are available.

One application of these tools is in a mobile wireless receiver, enabling the receiver to make more reliable, robust, and precise estimates of its location by combining multiple sources of wireless information from different types of wireless access points in overlapping networks. In an indoor setting, such as a sports complex, the floor of a building, a banquet hall, a shopping mall, etc., the different types of wireless access points can include IEEE 802.11a base units, 802.11b base units, Bluetooth(™) base units, and access points of other wireless networks. Similarly, mobile units in an outdoor setting can combine location estimates garnered from a variety of overlapping cell-phone networks.

Figure 1:
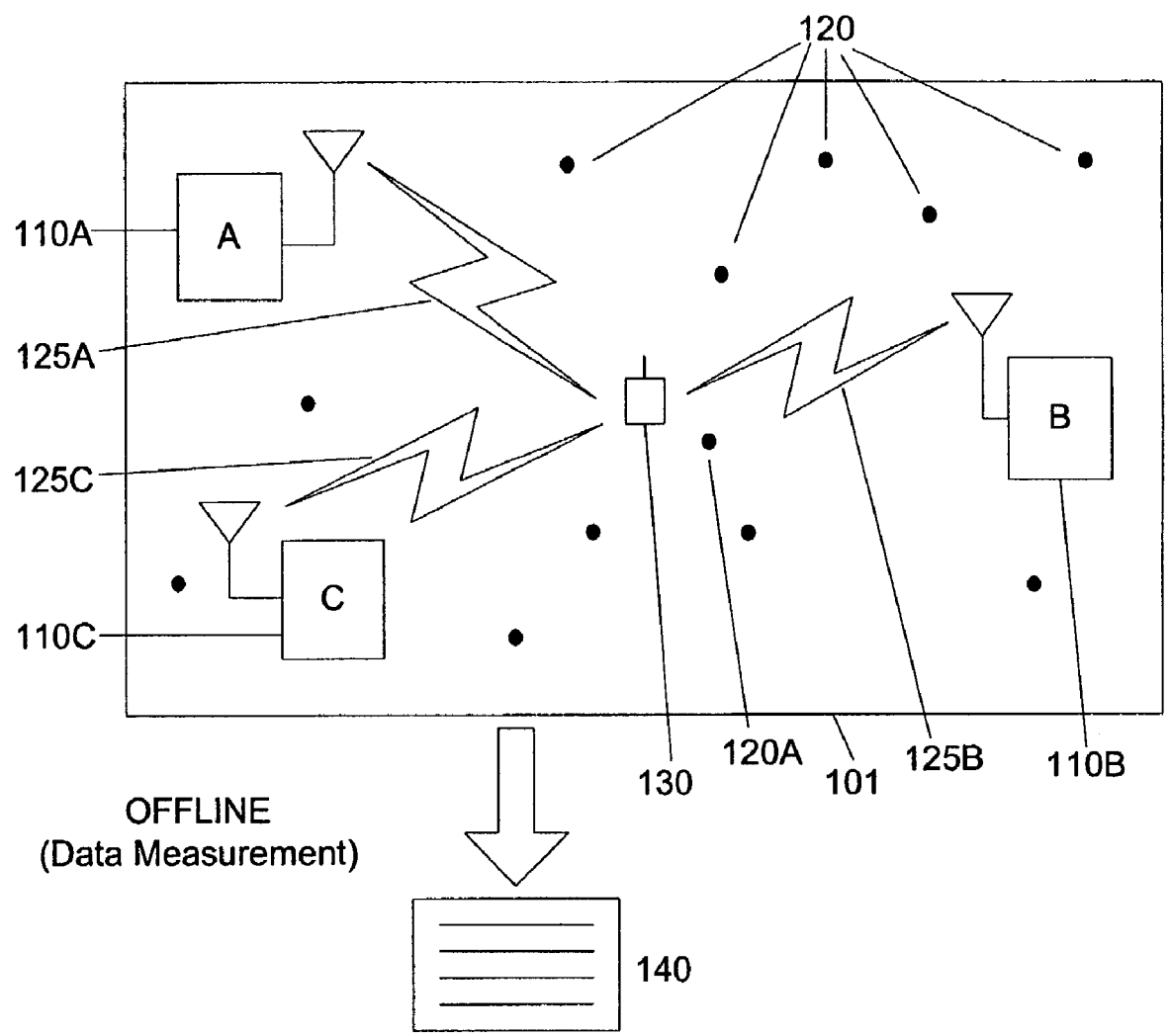
FIG. 1 shows an offline setup for compiling reference information on an RF operating environment.

FIG. 1 illustrates one version of a setup for gathering reference information on a collection of wireless transmitters. Here, the reference information is gathered "offline," meaning prior to the operation of a mobile unit that will later use the reference information during "run time." In this setup, one or more types of wireless networks serve an operating area 101. The operating area can be any region where the radio signals of various transmitters overlap. Examples of indoor locations are a floor or a section of a building, a hallway, a conference arena, the waiting area in an airport, or a sports complex. Examples of outdoor locations include a lawn area on a campus, a section of roadway, a section of airspace, a river surface, a coastal water, a lake, a portion of an ocean, or an underwater region. In these places and others, location estimates can be refined using existing deployed transmitters and the tools described herein.

The networks use fixed base units, designated in FIG. 1 as transmitters 110, shown as 110A, 110B, and 110C. These transmitters have some overlap in their coverage, so that most locations in operating area 101 are preferably reached by two or more of the base units. The base units can all be part of a cooperative network of transmitters such as the cell towers of a cell phone network, or they might be distinct transmitters, such as 802.11 wireless access points, Bluetooth(™) stations, or transmitters for AM radio, or FM radio, or TV stations.

One or more test units 130 is used to analyze the overlapping network of signals from transmitters 110. Test unit 130 is transported to various known locations—test points 120—that are scattered throughout the operating area. At each test point 120, test unit 130 receives signals 125 (shown as 125A, 125B, and 125C) from some or all of the transmitters 110.

Test unit 130 records information derived from signals 125; this information is used to calculate the test unit's location. Since the test unit performs this function at known locations 120, the calculated locations can be compared to the actual location, thereby yielding information on the accuracy of the calculations.

In FIG. 1, test unit 130 is shown as being at a particular known location 120A. Test unit 130 is configured to measure an indication of the received signal strength (the "RSSI") of the signals 125 that it receives. The RSSI is in general a monotonic function of the received power. Since signal strength generally decreases with distance from the transmitter, the RSSI can be indicative of distance from the transmitter. In conjunction with information about the transmitters, test unit 130 can therefore estimate its position from received signals 125.

In alternate embodiments of test unit 130, the unit is configured to measure a propagation delay time, which is also indicative of the distance to a transmitter. The delay time measurement can be interactive (for example, requiring the transmitter to respond to a "ping" from the test unit and using the round-trip communication time to estimate the distance) or it can be passive (such as when the test unit receives a time-code signal from the transmitter and measures the difference between that time code an on-board clock or other reference). In other embodiments, the signals 125 are part of a celled or sectored network, so that they inherently convey some location information to test unit 130.

Test unit 130 uses a variety of protocols for determining its calculated location. By comparing the outputs of each protocol to the known actual location 120A, test unit 130 determines the comparative reliability of each protocol. Various protocols can use different forms of calculations, such as the techniques of triangulation, nearest-neighbor location, and smallest polygon determination, among others. These protocols are further discussed below.

Other protocols use individual transmitters (such as 110A, 110B, or 110C) or subsets of transmitters 110 (such as 110A and 110C only, or 110A and 110B only) to find the calculated locations. By comparing the results of these calculations to the actual location 120A of the test unit, the relative reliability of the various transmitters can be found. For example, it would be helpful to know if measurements based on signals from transmitter 110A are more reliable than measurements based on signals from transmitter 110C.

These measurements provide the raw data for making such comparisons. Mathematical tools for analyzing the raw data and comparing the performances of each protocol are described below.

Information about the received signals is stored in a reference library 140. Reference library 140 stores information comparing the reliability of different protocols for determining the test unit's location. In one embodiment, reference library 140 stores a list of "weights" for each protocol—weighting factors that indicate the comparative reliability of each protocol. Later, during run time, the calculated locations made with different protocols can be averaged together, weighted by these reference weights. This weighted average provides a composite estimate of the calculated location.

In other embodiments of reference library 140, the library stores the raw RSSI information, or other signal indicators, or other information derived from the signal indicators, along with the actual locations of test locations 120. This information can then be processed at run time to determine the weighting assigned to the calculated locations that come from different protocols.

Reference library 140 is preferably stored in a memory, such as a disk file or a DRAM, on mobile unit 180. Alternatively, the reference library can be stored remotely and accessed though a wireless connection.

Figure 2:
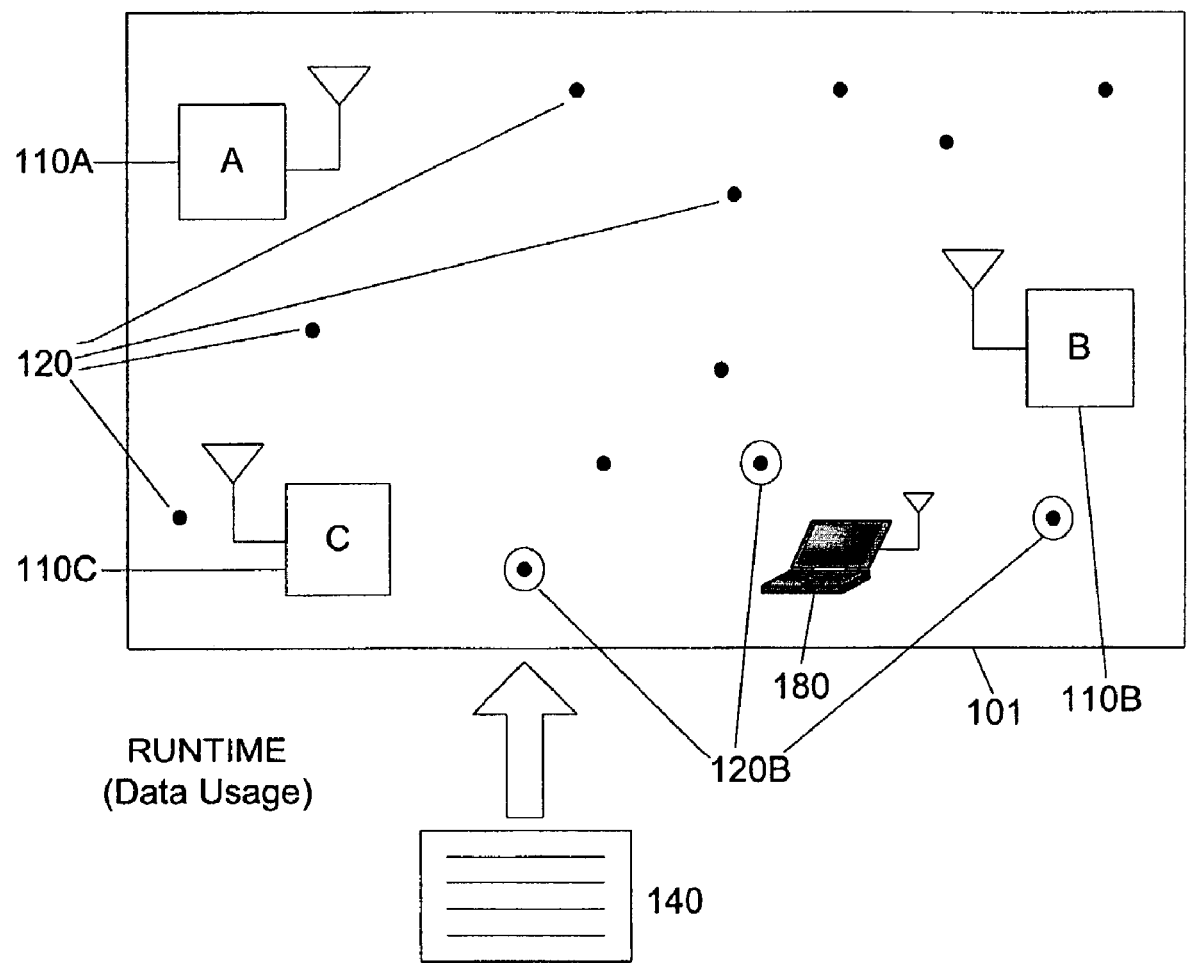
FIG. 2 shows a run-time setup for using reference information to refine location measurements made by a mobile unit in an RF operating environment.

FIG. 2 depicts the use of reference library 140 to find the location of a mobile unit 180 during run time. In this figure, mobile unit 180 is shown as a laptop computer in operational area 101 with a wireless network link to base units 110A–C. In other applications, mobile unit 180 can be any of a variety of wireless receivers, such as a wirelessly-linked personal digital assistant, a cordless telephone, a cellular telephone, or a location-finder aboard a car, boat, or airplane. Mobile unit 180 receives signals from base units 110 and calculates its position using several different protocols. These protocols, as discussed above, may differ in that they use different mathematical approaches (such as triangulation, nearest neighbors technique, or smallest polygon technique), or different subsets of the base units 110.

From each protocol, mobile unit 180 calculates an estimate of its location. In general, the different protocols yield slightly different estimates of the mobile unit's location. These different estimates are averaged together to generate a refined estimate—a combined estimate—of the mobile unit's location. The averaging can be done by assigning equal weights to each of the estimated locations from the various protocols. However, the averaging is preferably done by giving different weights to each of the estimates. The relative weights reflect the relative reliability of the individual protocols, and are preferably derived from the reference information in reference library 140.

In one embodiment of this technique, mobile unit 180 retrieves the weights, each of which is a real number, from reference library 140. It then multiples the value of each calculated location (represented in Cartesian coordinates) by the corresponding weight. Mobile unit 180 then adds these products to generate the weighted average of the calculated locations. This weighted average is the refined estimate of the position of mobile unit 180.

In another embodiment of the technique, mobile unit 180 retrieves from reference library 140 a set of data representing reference measurements taken at the various test locations 120. The mobile unit can then process this information during run time to determine the weights to be applied to each of the run-time calculations. Further, the run-time processing can optionally use data on subregions of operating area 101 to place greater emphasis on reference data gathered from local reference points 120B, which are near to the run-time location of mobile unit 180.

As an alternative to the linear combination of calculated measurements described above, the refined estimate of the mobile unit's location can be done using nonlinear combinations of the calculated measurements. For example, outlier data points might be discarded before computing the weighted average. Also, clustered data points can have their weights enhanced before the weighted average is summed.

Figure 3:
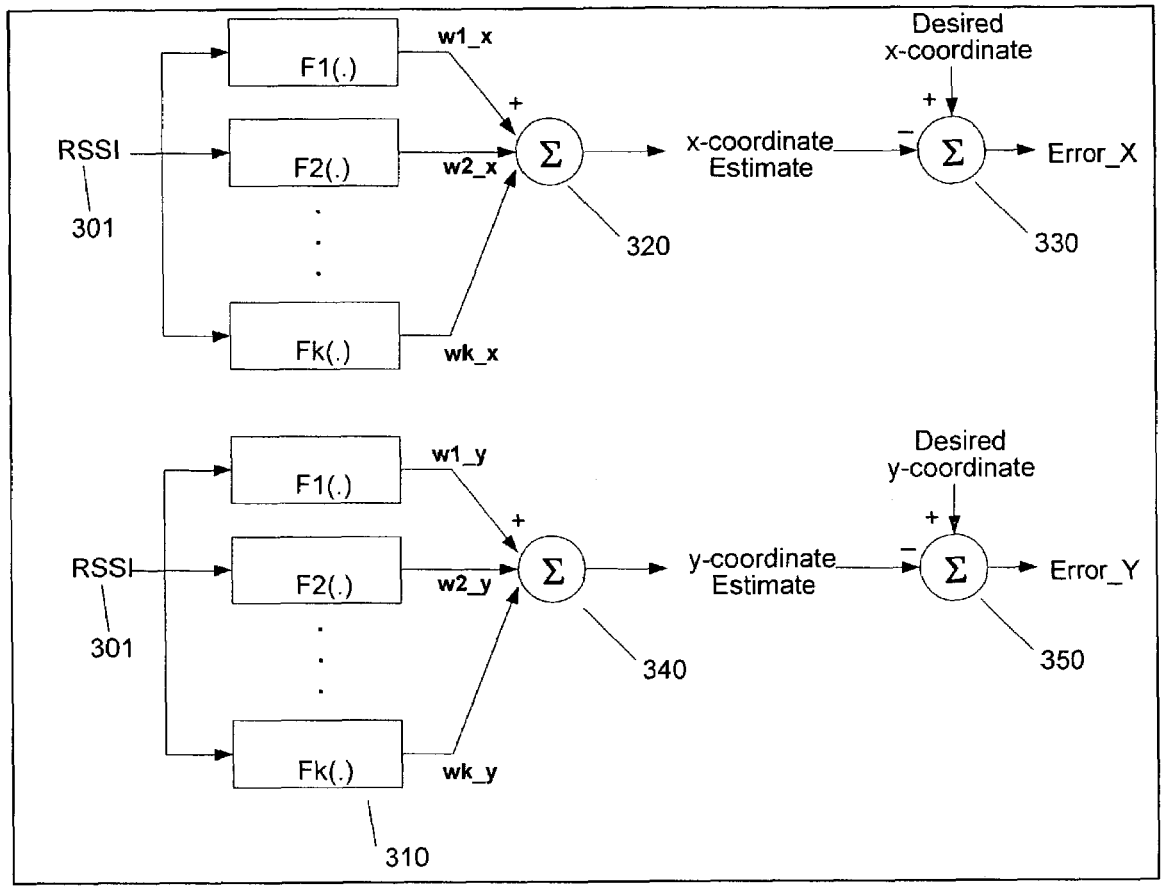
FIG. 3 is a schematic representation of a procedure for optimizing contribution weights that assist in refining location estimates.

FIG. 3 schematically illustrates one implementation of how to calculate the weighting values that can be stored in reference library 140. These weights are preferably calculated in a way that optimizes the accuracy of the refined location estimates-that is, they are calculated in a way that minimizes the error between the composite estimates and the actual known locations where the signals were received.

The implementation in FIG. 3 starts with a set of collected RSSI measurements 301. The RSSI measurements preferably include measurements from a collection of transmitters taken at a collection of test points. Then several different protocols 310 (F1, F2, ..., Fk) each calculate one x-coordinate and one y-coordinate from the RSSI measurements. Together, the calculated x- and y-coordinates represent a calculated position of the receiver in 2-D Cartesian coordinates.

The calculated x-coordinates of the individual estimates are combined to find an x-coordinate estimate. Each of the k protocols is assigned a weighting factor, $w1\_x$, $w2\_x$, ..., $wk\_x$. The x-coordinates from the various protocols are combined 320 into a weighted average according to these weights. That is, the x-coordinate from protocol I is multiplied by $w1\_x$, the x-coordinate from protocol 2 is multiplied by $w2\_x$, ..., and the x-coordinate from protocol k is multiplied by $wk\_x$. These products are then added together to generate the x-coordinate estimate. The x-coordinate estimate is compared 330 to the desired x-coordinate value, which in general is the known actual x-coordinate of the receiver. The difference between the estimate and the desired value is the error measurement, Error_x.

Similarly, the y-coordinates of the individual estimates are generated from RSSI measurements 301, and are combined 340 to generate a y-coordinate estimate. The y-coordinate estimate is compared 350 to the desired y coordinate, and the difference is used as an error measurement Error_y.

The weighting factors $w1\_x, w2\_x, ..., wk\_x$ and $w1\_y, w2\_y, ..., wk\_y$ are chosen, iteratively modified, or feedback-modified in a way that generally minimizes an error metric. This minimization provides an optimal set of weighting factors $w1\_x, w2\_x, ..., wk\_x$ and $w1\_y, w2\_y, ..., wk\_y$. Examples of approaches for finding the weighting factors are detailed below.

Figure 4:
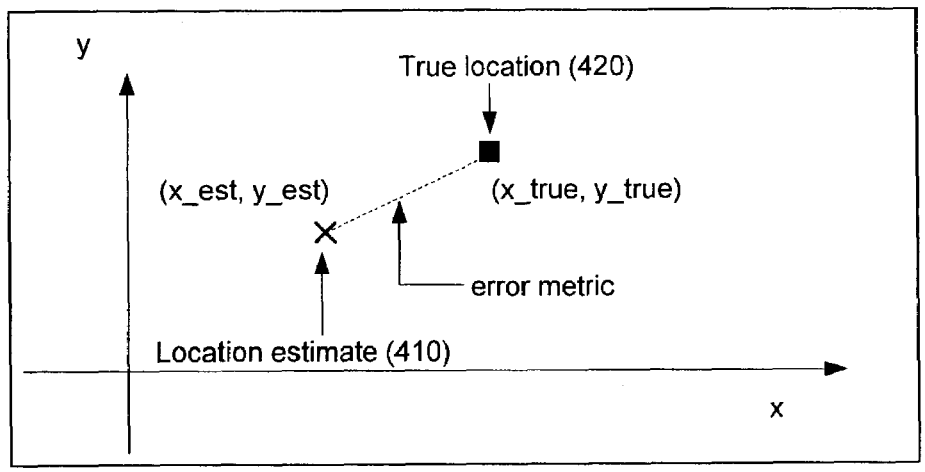
FIG. 4 illustrates an error metric for optimizing contribution weights.

The error metric that gets minimized is preferably the Euclidean distance between the estimated position 410 and the correct actual position 420. This metric is shown in FIG. 4. It can be calculated as $(Error\_x^2 + Error\_y^2)^{1/2}$. Alternative error metrics are $(Error\_x^2 + Error\_y^2)$, $(|Error\_x| + |Error\_y|)$, and independent minimizations of Error_x and/or of Error_y, among others.

While FIG. 3 and FIG. 4 illustrate this calculation using 2-D Cartesian coordinates (x, y), the calculation can also be performed (with appropriate mathematical manipulations) on coordinates stored in polar, spherical, or cylindrical formats. The calculation can be readily extended to 3-D Cartesian coordinates (x, y, z), giving not just the horizontal location of a mobile unit, but its vertical position as well. Similarly, the calculation can be made using a 1-D Cartesian system (x). Such a calculation would be appropriate when a mobile unit is known to be constrained on a straight linear region of space, such as a hallway, a stairway, or a roadway. With appropriate modifications, the 1-D embodiment can also be used when the linear region of space is not straight, such as for a hallway that has a bend or for a curved road.

These techniques are adaptable to different environments, since selective weights are trained specifically to a given environment. The weights $w1\_x, w2\_x, ..., wk\_x$ and $w1\_y, w2\_y, ..., wk\_y$ are preferably calculated during data-gathering "offline" phase, such as the situation presented in FIG. 1. In this approach, the collection of RSSI input measurements (or other input measurements) are gathered, prior to using the weights in a "run time" phase, when a mobile unit is operational. The weights can then be calculated and stored in a static data library, which is then available for reference during the run time phase. Alternatively, the data can be used as it is being gathered, so that the weights are dynamically trained during the operation of the mobile unit.

The initial RSSI measurements (or other inputs) from which the contribution weights are derived are preferably gathered through a static scene analysis. Static scene analysis is the approach of examining certain features in an existing environment, such as received signal strength characteristics from multiple existing access points in an operating area. One immediate benefit of static scene analysis is that deploying a separate sensor network infrastructure is not necessary. The location measurements can be made using the existing already-deployed hardware.

Location estimation techniques can advantageously combine different protocols in an adaptive sensor fusion algorithm. A preferred implementation of such techniques treats WLAN, Bluetooth(™), or other wireless interfaces as location sensors that are not only used for transmitting and receiving data traffic, but also collecting uncorrelated (possibly, statistically independent) information by sensing multiple heterogeneous access points at different locations and performing received signal strength measurements. With an appropriate fusion technique that combines heterogeneous information (received,signal strength measurements), extra estimation accuracy can be gained, in comparison to non-fusion based techniques. In other words, aggregate properties-which unavailable when using information individually and independently-improve the overall estimation accuracy.

2. Location Estimation Using RF Transceivers a. Static Scene Analysis.

Figure 5:
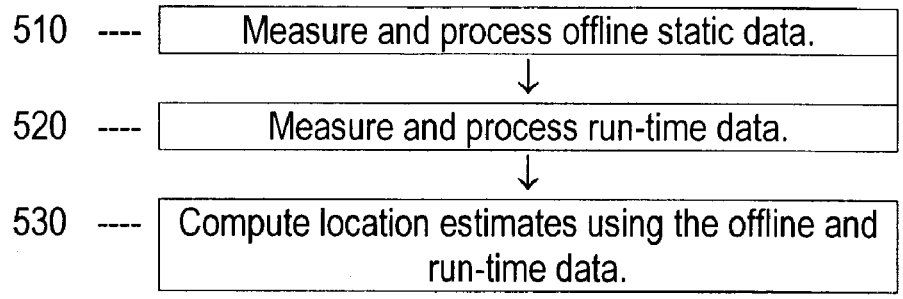
FIG. 5 is an overview flow diagram showing one embodiment of a method for locating a mobile unit.

FIG. 5 illustrates the overall procedure for a technique of location estimation that uses static scene analysis by measuring the characteristics of RF signals (such as real-time signal strength information), processing those characteristics, and using them in computational location estimation algorithms.

Step 510 of the technique involves the measurement, collection, and statistical processing of offline static data. In an indoor setting, such as the third floor of a building where 802.11 and Bluetooth(™) transmitters are available, the signals from those transmitters are received and characterized. The received signal strength information at various locations in the area of interest are first collected and analyzed. In one implementation, this involves collecting RSSIs (received signal strength indicator) from multiple IEEE 802.11b or IEEE 802.11a access points deployed at various locations. From Bluetooth(™) wireless signals, the link quality metric is also collected to characterize the scene at each location.

This step is considered offline because the location estimation system is not yet operational while these data are collected. This step is considered static because the location is being characterized by statistically processing the collected samples from various locations. The samples that are measured include information such as mean RSSI value, mean link quality metric, variance of RSSI, etc. Once the data have been processed in this offline stage, a location information database is built that characterizes RF properties of the sample locations.

Step 520 involves the measurement, collection, and statistical processing of run-time data. When the location-estimation system becomes operational, the signal strength information is measured by a mobile unit. Since radio propagation at any given instance is subject to random phenomena such as fading, shadowing, and loss, statistical processing of collected run-time measurement samples often becomes the crucial factor for accuracy of estimation. Advanced filtering schemes or sampling methods can be utilized to better map the run-time information to the location information database (constructed in offline stage). Such methods help yield smaller estimation errors.

Step 530 involves computing location estimates using run-time information and the offline location information database. Computational location estimation techniques require various comparisons, mapping, and matching between the run-time information and offline database. Numerous sources of interference and noise such as fading, blocking, and shadowing that occur both transiently and over significant periods of time, cause run-time information collection (such as the received signal strength) to be distorted, thereby introducing estimation errors.

b. Computational Location Estimation Techniques.

A variety of computational approaches can be employed at the first level of location estimation. Three important computational location estimation techniques are triangulation, k-nearest neighbor averaging, and smallest polygon.

Triangulation.

Figure 6:
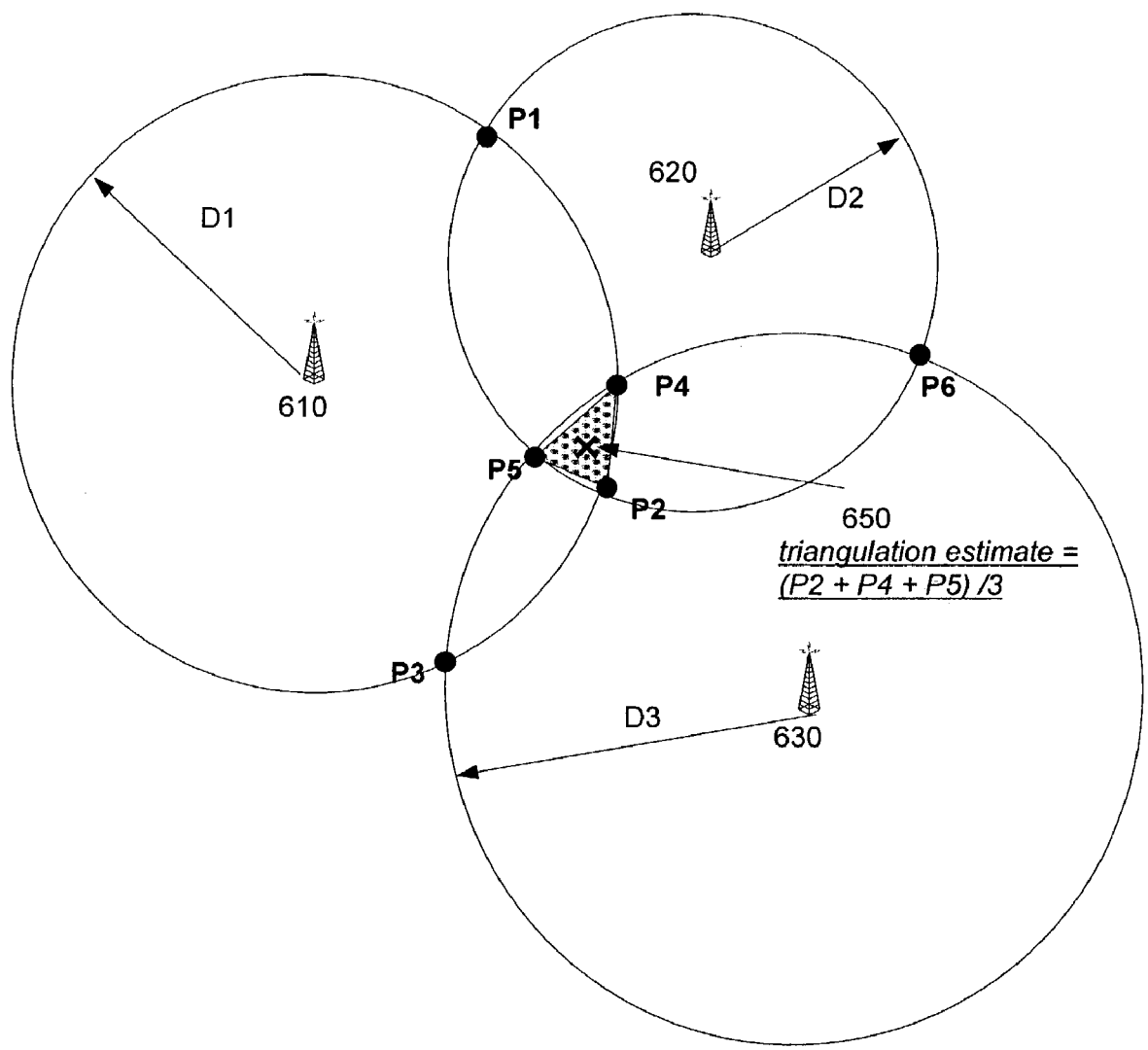
FIG. 6 illustrates a triangulation technique for estimating a location.

FIG. 6 illustrates one implementation of a triangulation technique. Triangulation is a method of positioning an object that is at known distances from reference points. Triangulation forms sets of circles that consist of equidistant points from reference points and computes a location estimate based on various intersection areas formed by these circles. To apply triangulation to known distances from a collection of base units, the base units become centers of circles. If the three circles formed by three base units meet at a single spot, that spot becomes the location estimate generated by the triangulation. Due to various errors introduced in real situations, however, the three estimated circles rarely meet at a single spot. For this reason, often regions of area formed by intersection points must be examined to obtain the location estimate.

In FIG. 6, six points P1, P2, P3, P4, P5, and P6 are deduced from intersection points between three circles. The circles are centered on three base stations 510, 520, and 530. The centroid 550 of the triangle formed by (P2, P4, P5) gives the best location estimate for this case since area of the triangle (P2, P4, P5) is the smallest.

K-Nearest Neighbor Averaging.

Figure 7:
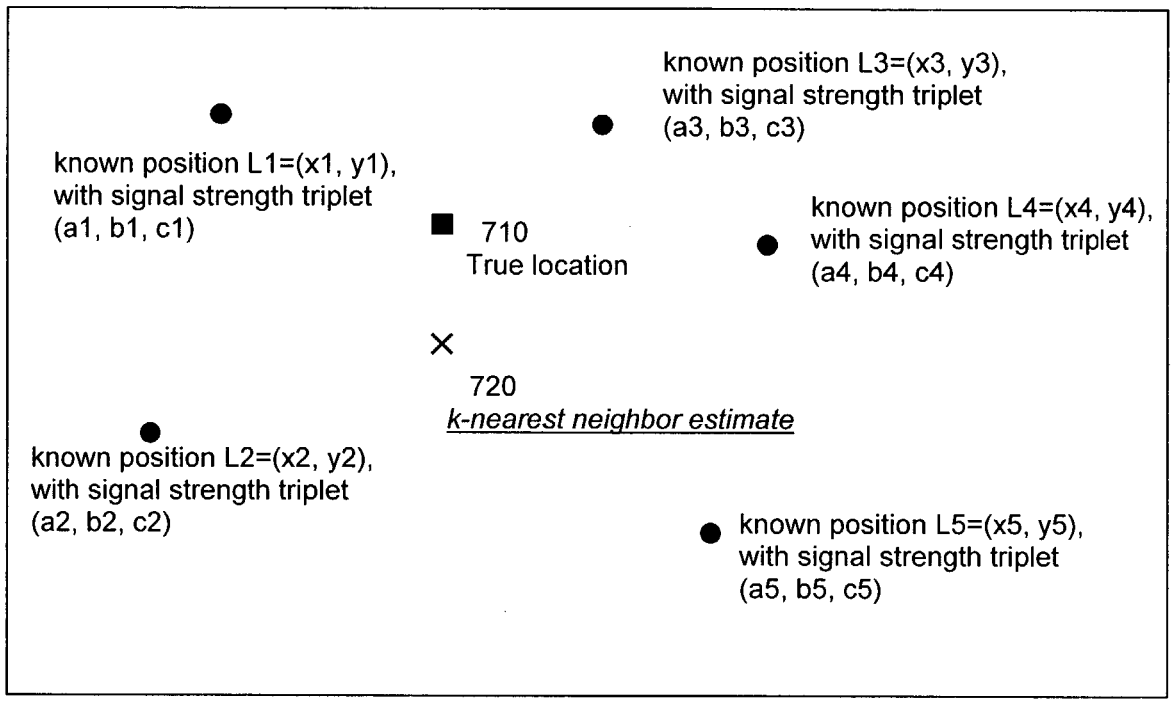
FIG. 7 illustrates a k-nearest neighbor technique for estimating a location.

FIG. 7 depicts one implementation of a k-nearest neighbor averaging technique. K-nearest-neighbor averaging is also referred to herein as the nearest neighbor technique.

The technique of k-nearest-neighbor averaging selects a set of reference locations that best match an observation made during run-time. The centroid of these selected reference locations is then used as the estimate of the run-time position. For example, if a triplet (a, b, c) represents signal strength measurements from three fixed base units when the receiver is at a location of interest 710, one embodiment of the technique retrieves the k closest locations from an offline information database. These "closest" locations are deemed to be the ones with recorded triplets (ai, bi, ci) that best match the measured run-time triplets (a, b, c).

With real-time measurements, three distance metrics (a, b, c) are measured from three different base units. The distance metrics are indicative of the distances to the base unit. For example, the distance metric can be the received signal strength, or some function of the signal strength. After measuring the real-time distance metrics, k candidate locations are obtained from an offline location information database. In the example shown in FIG. 7, k=5 candidate locations have been selected: L1, L2, L3, L4, and L5. These candidates are chosen so that the RMS of the metrics, $[(a-a_i)^2+(b-b_i)^2+(c-c_i)^2]^{1/2}$, is minimized. Alternate metrics can be used in other embodiments of the technique. The centroid 720 of these 5 measured locations is the location given by (L1+L2+L3+L4+L5)/5. This centroid, shown by the "X" in the figure, is then the resulting location estimate generated by the k-nearest-neighbor averaging.

Smallest Polygon.

Figure 8:
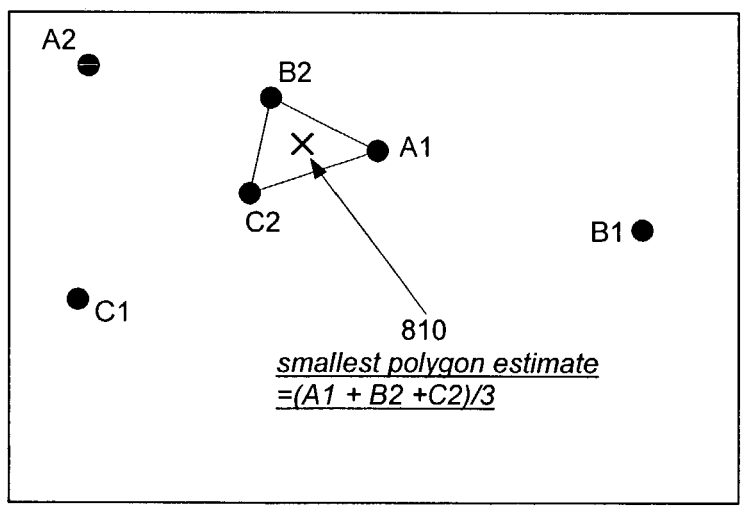
FIG. 8 illustrates a smallest polygon technique for estimating a location.

FIG. 8 illustrates one implementation of a smallest polygon technique. In this approach, one or more candidate locations are obtained from each of each of several reference base units. Then, the technique searches for the polygon with the smallest perimeter formed by the candidate locations. From each base unit, one and only one candidate location is used as a vertex of the polygon. Thus, if n reference base units are used in the system, the smallest polygon forms an n-vertex polygon.

As depicted in FIG. 8, the centroid of the polygon gives the location estimate. In this figure, A1, A2, B1, B2, C1, and C2 are two candidates from each of base units A, B, and C. In this case, the smallest-perimeter polygon is formed by joining A1, B2, and C2. These three points are used to find the location estimate, and the remaining three points are ignored. Since three base units were used for the measurements, the smallest polygon in this example is triangular. The location estimate generated by this method is the centroid 810 of the polygon, at (A1+B2+C2)/3.

3. Examples of Algorithms for Location Estimation a. Location Estimation Combining Different Techniques.

Figure 9:
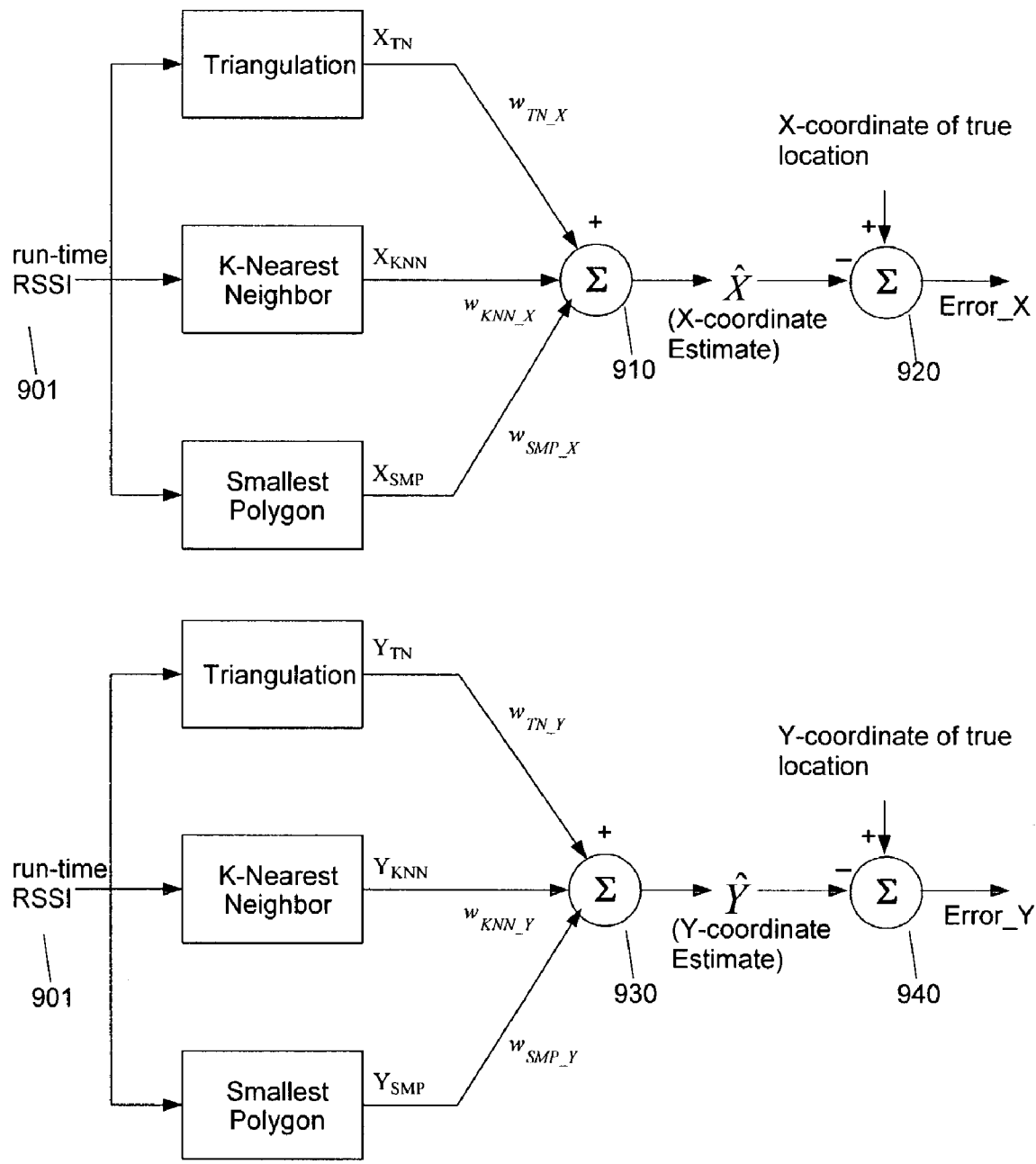
FIG. 9 is a schematic representation of a procedure for combining various location estimates into a refined location estimate.

FIG. 9 schematically illustrates one embodiment of an approach to refining a location estimate. This approach combines independent estimates from various different calculation techniques. Each branch, contributing a measurement from one technique, is weighted differently. The weights are based on each branch's error contribution with respect to actual X- and Y-coordinates of the true location.

The example shown in FIG. 9 combines three different location estimation techniques: triangulation, k-nearest neighbor, and smallest polygon. The inputs to this example are RSSI measurements 901 made by a mobile unit at a location of interest. The three different techniques are used to calculate the location of interest, generating x-coordinate estimates $X_{TN}$, $X_{KNN}$, and $X_{SMP}$, (from triangulation, k-nearest neighbor, and smallest polygon techniques, respectively), and y-coordinate estimates $Y_{TN}$, $Y_{KNN}$, and $Y_{SMP}$. The combiner is divided into two sections that compute X-coordinate and Y-coordinate estimates separately. Each component has three independent branches that are combined in summers 910 and 930, to yield the overall X- or Y-coordinate estimate for the system by computing the following two equations:

$$\hat{X}=w_{TN\_X} \cdot X_{TN}+w_{KNN\_X} \cdot X_{KNN}+w_{SMP\_X} \cdot X_{SMP}, \quad (1)$$

$$\hat{Y}=w_{TN\_Y} \cdot Y_{TN}+w_{KNN\_Y} \cdot Y_{KNN}+w_{SMP\_Y} \cdot Y_{SMP}. \quad (2)$$

The three different techniques process the RSSI run-time measurement inputs independently to provide separate branch inputs. Branch inputs, $X_{TN}$, $X_{KNN}$, and $X_{SMP}$ are weighted by $w_{TN\_X}$, $w_{KNN\_X}$, and $w_{SMP\_X}$, respectively. Then, the final X-coordinate estimate, $\hat{X}$, is computed by summing weighted branch inputs as described in Eq. (1). A similar process takes place to yield $\hat{Y}$. the final Y-coordinate estimate, by computing Eq. (2).

In this embodiment of the refinement, the combiner weights, $$W_X = \begin{bmatrix} w_{TN\_X} \\ w_{KNN\_X} \\ w_{SMP\_X} \end{bmatrix}$$

and $$W_Y = \begin{bmatrix} w_{TN\_Y} \\ w_{KNN\_Y} \\ w_{SMP\_Y} \end{bmatrix},$$

have been trained before being used in run-time. In a preferred embodiment of the scheme, the weights are optimized for a certain operating area where the mobile unit is used. A precise fit to that certain area is achieved by training the weights with offline measurements.

One preferred technique for obtaining the optimized weights uses a computational algorithm constrained to minimize mean square error of the location estimates with respect to the true location. This is called minimum mean square error (MMSE) training. The weight training process can occur in an offline phase, when system is not operational for end-user mobile units, but is available for administrative purposes. The calculated MMSE weights that minimize location estimation errors can then be used during run-time.

Alternatively, information gathered during run time can be used to compile or refine the reference information, using the error indicators Error_X and Error_Y generated by comparators 920 and 940 in FIG. 9.

Freedom of Applicability to Different Techniques.

Although FIG. 9 and the previous section discuss specifically the combination of triangulation, k-nearest neighbor, and smallest polygon location estimation techniques, it should be noted that any combination of two or more different location estimation techniques can be combined to produce improved location estimates. Any one of the base estimation blocks from FIG. 9 can be replaced, added, or removed.

MMSE Algorithm to Train Combiner Weights.

Run-time refined estimates in X and Y-coordinates are obtained by computing Eqs. (1) and (2), respectively. The true X and Y-coordinates at known measurement locations are the desired output the mobile unit attempts to estimate with the smallest possible errors. The known measurement locations are preferably the coordinates of offline test points, d=($d_x$, $d_y$).

The accuracy of the estimates is referenced by computing estimation errors with respect to the desired output, d. MMSE training uses this error reference to compute optimal weights. Since the calculation of X and Y-coordinate components are symmetrical, we illustrate the MMSE training algorithm in X-coordinate component, i.e. the training of weight vector $$W_X = \begin{bmatrix} w_{TN\_X} \\ w_{KNN\_X} \\ w_{SMP\_X} \end{bmatrix}.$$

Let column vector, $$\underline{X} = \begin{bmatrix} X_{TN} \\ X_{KNN} \\ X_{SMP} \end{bmatrix},$$

contain branch inputs (provided by estimates from different techniques as in FIG. 9) from triangulation (TN), k-nearest neighbor (KNN), and smallest polygon (SMP). Then, Eq. (1) can be rewritten as $\hat{X}=W_X^T \cdot \underline{X}$, where superscript T denotes the transpose of a vector. The error in the X-coordinate is written as $e_X = d_X - \hat{X} = d_X - W_x^T \cdot \underline{X}$. By taking the expectation (statistical averaging) of squared $e_X$, the mean square error (MSE) equation is derived:

$$Ee_X^2 = Ed_X^2 + W_X^T E[\underline{X} \cdot \underline{X}^T] W_X - 2E[d_X \cdot \underline{X}^T] W_X. \quad (3)$$

Eq. (3) describes the quantity that we are interested of minimizing. By denoting $R_{XX} = E[\underline{X} \cdot \underline{X}^T]$ and $R_{DX} = E[d_X \cdot \underline{X}^T]$, Eq. (3) becomes:

$$MSE = Ed^2 + W_X^T R_{XX} W_X - 2R_{DX} W_X. \quad (4)$$

Taking the derivative with respect to W and setting it to 0, yields the following MMSE solution for the X-coordinate component:

$$W_X^* = R_{XX}^{-1} R_{DX}. \quad (5)$$

Note that $R_{XX}^{-1}$ is inverse of the autocorrelation matrix of $\underline{X}$, and $R_{DX}$ is the cross-correlation between $\underline{X}$ and $d_X$. Also, note that $R_{DX}$ is in column vector form. Eq. (5) states that W*, the optimal MMSE weights, are equivalent to the product of the inverse of $R_{XX}$ (with branch inputs consisting of estimates from TN, KNN, and SMP) and $R_{DX}$. Similarly, the optimal MMSE weights for the Y-coordinate component are described by Eq. (6):

$$W_Y^* = R_{YY}^{-1} R_{DY}. \quad (6)$$

Applying MMSE Algorithm in Actual Weight Training.

The following sequences show a preferred embodiment of a method for determining the weight factors to be used in combining location estimates from different techniques. The weight training is preferably performed in an offline phase, before the weights are actually used during run-time. In other embodiments, the weight training can be done or continued during run-time, for example, if on-going training is desired. Note also that various steps can be altered, supplemented, or deleted, according to the needs of the particular application.

1. Construct matrices from the branch inputs to the X-coordinate estimates. Let column vectors $$\underline{X}_{TN} = \begin{bmatrix} X_{TN}(1) \\ \vdots \\ X_{TN}(N) \end{bmatrix}, \underline{X}_{KNN} = \begin{bmatrix} X_{KNN}(1) \\ \vdots \\ X_{KNN}(N) \end{bmatrix}, \text{ and } \underline{X}_{SMP} = \begin{bmatrix} X_{SMP}(1) \\ \vdots \\ X_{SMP}(N) \end{bmatrix}$$

contain N values of branch inputs provided by estimates from different techniques, i.e. triangulation, k-nearest neighbor, and smallest polygon estimates, at various N locations. Similarly, the actual X-coordinates of these N training locations are known. Together the known actual locations form a vector $$\underline{D}_X = \begin{bmatrix} d_X(1) \\ \vdots \\ d_X(N) \end{bmatrix}.$$

The matrix $R_{XX}$ then has the following form:

$$R_{XX} = \begin{bmatrix} E(X_{TN} \times X_{TN}) & E(X_{TN} \times X_{KNN}) & E(X_{TN} \times X_{SMP}) \\ E(X_{TN} \times X_{KNN}) & E(X_{KNN} \times X_{KNN}) & E(X_{KNN} \times X_{SMP}) \\ E(X_{TN} \times X_{SMP}) & E(X_{KNN} \times X_{SMP}) & E(X_{SMP} \times X_{SMP}) \end{bmatrix}.$$

For $X_{TN}$, the mean-square $E(X_{TN} \times X_{TN})$ is obtained by averaging $X_{TN}^2$ over all N training locations $$[E(X_{TN} \times X_{TN}) := \frac{1}{N} \sum_{i=1}^{N} X_{TN}^2(i)],$$

and similarly for $X_{KNN}$ and $X_{SMP}$. The cross-comparison of $X_{TN}$ and $X_{KNN}$ (written in the form of '$E(X_{TN} \times X_{KNN})$' in the $R_{XX}$ expression above) is computed by averaging $X_{TN} \times X_{KNN}$ over all N training locations.

$$[E(X_{TN} \times X_{KNN}) := \frac{1}{N} \sum_{i=1}^{N} X_{TN}(i) \times X_{KNN}(i).]$$

Other cross-comparisons are computed accordingly. (Note that in many applications, the 1/N prefactor in the previous two expressions need not be computed, since this normalization cancels with itself in the final portions of the calculation, such as in Eqs. 5 and 6 above. Similarly, mathematical manipulations can allow the various equations disclosed herein to be implemented in a variety of fashions, as suitable to the particular applications at hand.)

2. Construct the $R_{DX}$ vector. $R_{DX}$ contains cross-comparisons of branch inputs (the estimates from different techniques, i.e. TN, KNN, and SMP) and true X-coordinates of all N known training locations such that:

$$R_{DX} = \begin{bmatrix} E(X_{TN} \times d_X) \\ E(X_{KNN} \times d_X) \\ E(X_{SMP} \times d_X) \end{bmatrix}.$$

3. Do Step 1 similarly for the Y-coordinate components.
4. Do Step 2 similarly for the Y-coordinate components.
5. Optimal MMSE weights for the refined X-coordinate component are obtained by evaluating the following:

$$W_X^* = R_{XX}^{-1} R_{DX}.$$

6. Optimal MMSE weights for the refined Y-coordinate component are obtained by evaluating the following:

$$W_Y^* = R_{YY}^{-1} R_{DY}.$$

b. Enhancement of Location Estimation Techniques.
Enhanced Triangulation.

As discussed above, triangulation is one of the techniques for calculating an estimated location based on the characteristics of signals received from fixed base units. In one embodiment of triangulation the final location estimate from triangulation is obtained by computing the centroid of the smallest-area triangle formed by a three-point subset of six points. The six points are intersections of three circles obtained by solving systems of equations for circles, whose centers are locations of three base units, and whose radii are determined by signal strength measurement.

This embodiment of the basic triangulation technique can be described as follows. In other embodiments, various steps can be altered, supplemented, or deleted, according to the needs of the particular application.

1. After making the initial offline measurements, use the offline measurements to construct a mapping relation between received signal strength samples, RSSI, and distance d from each base unit. The actual process to do so is preferably performed in the following manner:
   a. Collect RSSIs at various offline measurement locations (known test points) for all base units.
   b. Since coordinate of each offline measurement location is known, the distance from each base unit can also be computed, i.e. $d = \sqrt{(x_i - x_{AP})^2 + (y_i - y_{AP})^2}$, where $(x_i, y_i)$ is the coordinate of i-th known offline measurement location and $(x_{AP}, y_{AP})$ is the location of a base unit (access point).
   c. Create N bins in distance for each base unit. The more bins are used, the higher the resolution of distance that can be calculated.
   d. Put RSSI samples accordingly into bins and index the bins by their mean RSSI value. This implements a simple lookup function to obtain distance d, given an RSSI value. This function can be called $d_k = F_k(RSSI_k)$, where $d_k$ is the distance from base unit k with for a received signal strength measurement of $RSSI_k$.
      For quick access, this function can be stored as reference information in a memory on board mobile units that use the function for position determination.

2. Construct an equation for each circle with its center being the location of the base unit and its radius being the value of $d_k = F_k(RSSI_k)$ for the measured received signal strength.

3. Systems of equations relating sets of two circles can now be formed. Consider three circles from three base units A, B, and C. Circles A and B form one pair (system) of equations. Circles B and C form a second system, and circles A and C form a third system. Up to six distinct solutions (intersection points between the circles) can be obtained, i.e. two points from circles A and B, two points from circles B and C, and two points from circles A and C.

4. Form all distinct triangles from combinations of three points. The combination must include at least one point from each system of equations.

5. For all distinct triangles, find the smallest area triangle. Let $P_{AB}$, $P_{BC}$, and $P_{AC}$ denote X and Y-coordinates of three vertices of the smallest-area triangle. Note that $P_{AB}$, $P_{BC}$, and $P_{AC}$ are points resulting from three systems of equations of circles, i.e., circles A and B, circles B and C, and circles A and C.

6. The location estimate is obtained by calculating the average $\hat{L}$ of the three vertices of the smallest area triangle;

$$\hat{L} = \frac{1}{3} P_{AB} + \frac{1}{3} P_{BC} + \frac{1}{3} P_{AC}$$

gives the location estimate of triangulation. Since $\hat{L} = (\hat{L}_X, \hat{L}_Y)$ in X and Y coordinates, computing $$\hat{L}_X = \frac{1}{3} x_{AB} + \frac{1}{3} x_{BC} + \frac{1}{3} x_{AC} \text{ and } \hat{L}_Y = \frac{1}{3} y_{AB} + \frac{1}{3} y_{BC} + \frac{1}{3} y_{AC}$$

gives the estimate $\hat{L}$. It should be noted that $P_{AB} = (x_{AB}, y_{AB})$ (in terms of the X and Y-coordinates of $P_{AB}$), and similarly for $P_{BC} = (x_{BC}, y_{BC})$ and $P_{AC} = (x_{AC}, y_{AC})$.

The basic triangulation technique can be enhanced. The enhancement comes from the same reasoning described earlier for the technique of refining the combination of different location-estimation.

Step 6 of the basic triangulation algorithm must be modified to apply the enhancement. In the basic triangulation algorithm, the location estimate $\hat{L}$ is obtained by averaging points $P_{AB}$, $P_{BC}$, and $P_{AC}$ (which are intermediate location calculations from the triangulation calculation). In other words, equal weights of ⅓ are applied to vertices to obtain centroid of the triangle formed by $P_{AB}$, $P_{BC}$, and $P_{AC}$. Instead of the equal weights, some other weighting criterion, that is further optimized to reflect how these points should be combined, can be applied to yield a more precise location estimate.

This enhanced triangulation takes advantage of the ability to apply separate weights to various X and Y coordinate estimates. The calculation is preferably separated into two components in X and Y. Thus, the location estimate for enhanced triangulation, $\hat{L}_{enhanced\_TN} = (\hat{x}_{enhanced\_TN}, \hat{y}_{enhanced\_TN})$, is written in the following form:

$$\hat{x}_{enhanced\_TN} = v_{AB\_X} x_{AB} + v_{BC\_X} x_{BC} + v_{AC\_X} x_{AC} \quad \text{(X-coordinate component)}$$

$$\hat{x}_{enhanced\_TN} = v_{AB\_Y} y_{AB} + v_{BC\_Y} y_{BC} + v_{AC\_Y} y_{AC} \quad \text{(Y-coordinate component)}$$

The enhanced triangulation weights $$V_X = \begin{bmatrix} v_{AB\_X} \\ v_{BC\_X} \\ v_{AC\_X} \end{bmatrix} \text{ and } V_Y = \begin{bmatrix} v_{AB\_Y} \\ v_{BC\_Y} \\ v_{AC\_Y} \end{bmatrix}$$

from the MMSE criterion are obtained by evaluating the following:

$$V_X^* = R_{XX}^{-1} R_{DX}, \quad (7)$$

$$V_Y^* = R_{YY}^{-1} R_{DY}. \quad (8)$$

The number of weighting factors depends upon the number of circle-intersections that are used in the triangulation. In this implementation of the triangulation technique, there are 3 weights for the x-coordinate estimates and 3 weights for the y-coordinate estimates.

In Eqs. (7) and (8), matrices $R_{XX}$ and $R_{YY}$ are in the following form:

$$R_{XX} = \begin{bmatrix} E(x_{AB} \times x_{AB}) & E(x_{AB} \times x_{BC}) & E(x_{AB} \times x_{AC}) \\ E(x_{AB} \times x_{BC}) & E(x_{BC} \times x_{BC}) & E(x_{BC} \times x_{AC}) \\ E(x_{AB} \times x_{AC}) & E(x_{BC} \times x_{AC}) & E(x_{AC} \times x_{AB}) \end{bmatrix}, \text{ and}$$

$$R_{YY} = \begin{bmatrix} E(y_{AB} \times y_{AB}) & E(y_{AB} \times y_{BC}) & E(y_{AB} \times y_{AC}) \\ E(y_{AB} \times y_{BC}) & E(y_{BC} \times y_{BC}) & E(y_{BC} \times y_{AC}) \\ E(y_{AB} \times y_{AC}) & E(y_{BC} \times y_{AC}) & E(y_{AC} \times y_{AB}) \end{bmatrix}.$$

Finally, $R_{DX}$ and $R_{DY}$ are $$R_{DX} = \begin{bmatrix} E(x_{AB} \times x_i) \\ E(x_{BC} \times x_i) \\ E(x_{AC} \times x_i) \end{bmatrix} \text{ and } R_{DY} = \begin{bmatrix} E(y_{AB} \times y_i) \\ E(y_{BC} \times y_i) \\ E(y_{AC} \times y_i) \end{bmatrix}.$$

The desired location $d_i=(x_i, y_i)$ in this case is the true X and Y coordinates of the i-th known training location (the test point's true location, which the triangulation should be able to estimate accurately). In the offline phase, $R_{XX}$, $R_{YY}$, $R_{DX}$, and $R_{DY}$ are computed to evaluate Eqs. (7) and (8), obtaining the weights $V_X^*$ and $V_Y^*$ for enhanced triangulation.

Enhanced K-Nearest Neighbor.

As discussed above, k-nearest neighbors is one of the techniques for calculating an estimated location based on the characteristics of signals received from fixed base units. In one embodiment, the basic algorithm for k-nearest neighbor technique is decomposed into the following procedure (using the case where signals are received from three base units, A, B, and C). In other embodiments, various steps can be altered, supplemented, or deleted, according to the needs of the particular application.

1. From offline measurement, triplets in the form of ($RSSI_A$, $RSSI_B$, $RSSI_C$) can be associated with known offline measurement locations at ($x_i$, $y_i$). That is, $RSSI_A$, $RSSI_B$, and $RSSI_C$ are received signal strengths from base unit A, B, and C, respectively, at known offline measurement locations in X and Y-coordinates ($x_i$, $y_i$).

2. During run-time, received signal strength measurements with respect to base units A, B, and C are obtained. Let us call this run-time triplet ($RSSI_{A\_RUN}$, $RSSI_{B\_RUN}$, $RSSI_{C\_RUN}$) representing run-time measurements with respect to base units A, B, and C. The nearest neighbors algorithm searches for k closest matches of run-time triplet, ($RSSI_{A\_RUN}$, $RSSI_{B\_RUN}$, $RSSI_{C\_RUN}$), from the pool of offline triplets ($RSSI_A$, $RSSI_B$, $RSSI_C$). The closest match is determined by evaluating the root mean squared error between the offline and run-time triplets, i.e. evaluating:

$$\text{rms} = \sqrt{(RSSI_A - RSSI_{A\_RUN})^2 + (RSSI_B - RSSI_{B\_RUN})^2 + (RSSI_C - RSSI_{C\_RUN})^2}.$$

3. Location estimate by k-nearest neighbor is obtained by evaluating $$\hat{L} = \frac{1}{k} L_1 + \ldots + \frac{1}{k} L_k.$$

Here, $L_1=(L_{1\_X}, L_{2\_Y})$ to $L_k=(L_{k\_X}, L_{k\_Y})$ are coordinates of the k closest matches of run-time triplet from the pool of offline triplets. Statistical average of these locations give the k-nearest neighbor estimate.

As was the case for triangulation, the k-nearest neighbor technique can be enhanced by using weighted combinations for the individual branches. This enhancement modifies the final location estimate expression to be the following:

$\hat{x} = v_{1\_X} \cdot L_{1\_X} + \ldots + v_{k\_X} \cdot L_{k\_X}$ (X-coordinate component)

$\hat{y} = v_{1\_Y} \cdot L_{1\_Y} + \ldots + v_{k\_Y} \cdot L_{k\_Y}$ (Y-coordinate component)

This enhancement modifies the way the intermediate location calculations $L_{1\_X}, L_{2\_X}, \ldots L_{k\_X}, L_{1\_Y}, L_{2\_Y}, \ldots L_{k\_Y}$ from the k-nearest-neighbors technique are used.

Note that the enhanced k-nearest neighbor extends the basic algorithm in two folds, first by breaking into X and Y components separately and secondly by replacing equal weight 1/k with optimal weighting, $v_k$'s.

The enhanced k-nearest neighbor weights $$V_X = \begin{bmatrix} v_{1\_X} \\ \vdots \\ v_{k\_X} \end{bmatrix} \text{ and } V_Y = \begin{bmatrix} v_{1\_Y} \\ \vdots \\ v_{k\_Y} \end{bmatrix}$$

in MMSE criterion are obtained by evaluating the following in the offline weight training:

$$V_X^* = R_{XX}^{-1} R_{DX}, \quad (9)$$

$$V_Y^* = R_{YY}^{-1} R_{DY}. \quad (10)$$

The number of weighting factors here depends upon the number of nearest neighbors that are included in the combination. In this implementation of the enhanced k-nearest neighbor technique, there are k weights for the x-coordinate estimates and k weights for the y-coordinate estimates.

In Eqs. (9) and (10), matrices $R_{XX}$ and $R_{YY}$ are in the following form:

$$R_{XX} = \begin{bmatrix} E(L_{1\_X} \times L_{1\_X}) & \cdots & E(L_{1\_X} \times L_{k\_X}) \\ \vdots & \ddots & \vdots \\ E(L_{k\_X} \times L_{1\_X}) & \cdots & E(L_{k\_X} \times L_{k\_X}) \end{bmatrix}, \text{ and}$$

$$R_{XX} = \begin{bmatrix} E(L_{1\_Y} \times L_{1\_Y}) & \cdots & E(L_{1\_Y} \times L_{k\_Y}) \\ \vdots & \ddots & \vdots \\ E(L_{k\_Y} \times L_{1\_Y}) & \cdots & E(L_{k\_Y} \times L_{k\_Y}) \end{bmatrix}.$$

Here, $R_{DX}$ and $R_{DY}$ are $$R_{DX} = \begin{bmatrix} E(L_{1\_X} \times x_i) \\ \vdots \\ E(L_{k\_X} \times x_i) \end{bmatrix} \text{ and } R_{DY} = \begin{bmatrix} E(L_{1\_Y} \times y_i) \\ \vdots \\ E(L_{k\_Y} \times y_i) \end{bmatrix}.$$

Desired location $d_i=(x_i, y_i)$ in this case is true X and Y coordinates of the i-th known training location (the true location, which needs to be estimated accurately). In the offline phase, $R_{XX}$, $R_{YY}$, $R_{DX}$, and $R_{DY}$ are computed to evaluate Eqs. (9) and (10) obtaining MMSE weights for the enhanced k-nearest neighbor estimate.

Enhanced Smallest Polygon.

The smallest polygon technique can reuse the same offline processed data as the k-nearest neighbor algorithm. Recall that k-nearest neighbor requires offline signal strength measurement from known offline locations with respect to each base unit. One preferred version of the basic smallest polygon technique uses the same data and is described by the following procedure:

1. Reuse offline data of k-nearest neighbor (or alternatively, perform the same offline data processing for offline received signal strength measurements). The received mean signal strength ($RSSI_{offline}$) is computed and stored with respect to each base unit at various known offline locations. It should be noted that X and Y-coordinates of offline measurement locations are coupled with $RSSI_{offline}$ values for each base unit as well.

2. At run-time, one or preferably two or more candidate locations from each base unit having the closest match in run-time RSSI measurement and offline RSSI measurements are selected.
   a. The mean absolute difference is used to find candidate locations from each base unit, i.e. candidate locations are obtained from the offline data pool having smallest $\Delta = |RSSI_{offline} - RSSI_{run-time}|$.
   b. Each base unit provides at least one candidate.

3. Search through all polygons that can be formed using the candidate locations as vertices of the polygon. Only distinct-vertex polygons with one vertex contributed from each of the different base units are considered. The polygon with smallest perimeter (sum of lengths of all sides) is then chosen.

4. The smallest-polygon location estimate is obtained by evaluating $$\hat{L} = \frac{1}{3}P_A + \frac{1}{3}P_B + \frac{1}{3}P_C.$$

Here $P_A=(P_{A\_X}, P_{A\_Y})$, $P_B=(P_{B\_X}, P_{B\_Y})$, and $P_{C\_X}, P_{C\_Y})$ are coordinates of the vertices of the smallest polygon, and are contributed by base units A, B, and C, respectively. Statistical average of these locations gives the smallest polygon location estimate.

The enhanced smallest polygon replaces the equally weighted vertices with error-optimized weights in both X and Y-coordinate components as the following:

$\hat{x} = v_{A\_X} P_{A\_X} + v_{B\_X} P_{B\_X} + v_{C\_X} P_{C\_X}$ (X-coordinate component)

$\hat{y} = v_{A\_Y} P_{A\_Y} + v_{B\_Y} P_{B\_Y} + v_{C\_Y} P_{C\_Y}$ (Y-coordinate component)

where the enhanced smallest polygon estimate $\hat{L}=(\hat{x}, \hat{y})$ is calculated from the intermediate location calculations $P_A$, $P_B$, and $P_C$.

The enhanced smallest polygon weights $$V_X = \begin{bmatrix} v_{A\_X} \\ v_{B\_X} \\ v_{C\_X} \end{bmatrix} \text{ and } V_Y = \begin{bmatrix} v_{A\_Y} \\ v_{B\_Y} \\ v_{C\_Y} \end{bmatrix}$$

according to the MMSE criterion are obtained by evaluating the following:

$$V_X^* = R_{XX}^{-1} R_{DX}, \quad (11)$$

$$V_Y^* = R_{YY}^{-1} R_{DY}. \quad (12)$$

The number of weighting factors here depends upon the number of base stations that are included in the combination. In this example, there are 3 weights for the x-coordinate estimates and 3 weights for the y-coordinate estimates.

In Eqs. (11) and (12), matrices $R_{XX}$ and $R_{YY}$ are in the following form:

$$R_{XX} = \begin{bmatrix} E(P_{A\_X} \times P_{A\_X}) & E(P_{A\_X} \times P_{B\_X}) & E(P_{A\_X} \times P_{C\_X}) \\ E(P_{A\_X} \times P_{B\_X}) & E(P_{B\_X} \times P_{B\_X}) & E(P_{B\_X} \times P_{C\_X}) \\ E(P_{A\_X} \times P_{C\_X}) & E(P_{B\_X} \times P_{C\_X}) & E(P_{C\_X} \times P_{C\_X}) \end{bmatrix}, \text{ and}$$

$$R_{YY} = \begin{bmatrix} E(P_{A\_Y} \times P_{A\_Y}) & E(P_{A\_Y} \times P_{B\_Y}) & E(P_{A\_Y} \times P_{C\_Y}) \\ E(P_{A\_Y} \times P_{B\_Y}) & E(P_{B\_Y} \times P_{B\_Y}) & E(P_{B\_Y} \times P_{C\_Y}) \\ E(P_{A\_Y} \times P_{C\_Y}) & E(P_{B\_Y} \times P_{C\_Y}) & E(P_{C\_Y} \times P_{C\_Y}) \end{bmatrix}.$$

$R_{DX}$ and $R_{DY}$ are $$R_{DX} = \begin{bmatrix} E(P_{A\_X} \times x_i) \\ E(P_{B\_X} \times x_i) \\ E(P_{C\_X} \times x_i) \end{bmatrix} \text{ and } R_{DY} = \begin{bmatrix} E(P_{A\_Y} \times y_i) \\ E(P_{B\_Y} \times y_i) \\ E(P_{C\_Y} \times y_i) \end{bmatrix}.$$

The desired location $d_i=(x_i, y_i)$ in this case is the true X and Y coordinates of the i-th known training location (the true location, which needs to be estimated accurately). In the offline phase, $R_{XX}$, $R_{YY}$, $R_{DX}$, and $R_{DY}$ are computed to evaluate Eqs. (11) and (12), yielding the weights for the enhanced smallest polygon technique.

Sample Procedure for Collecting Reference Information Offline.

Figure 10:
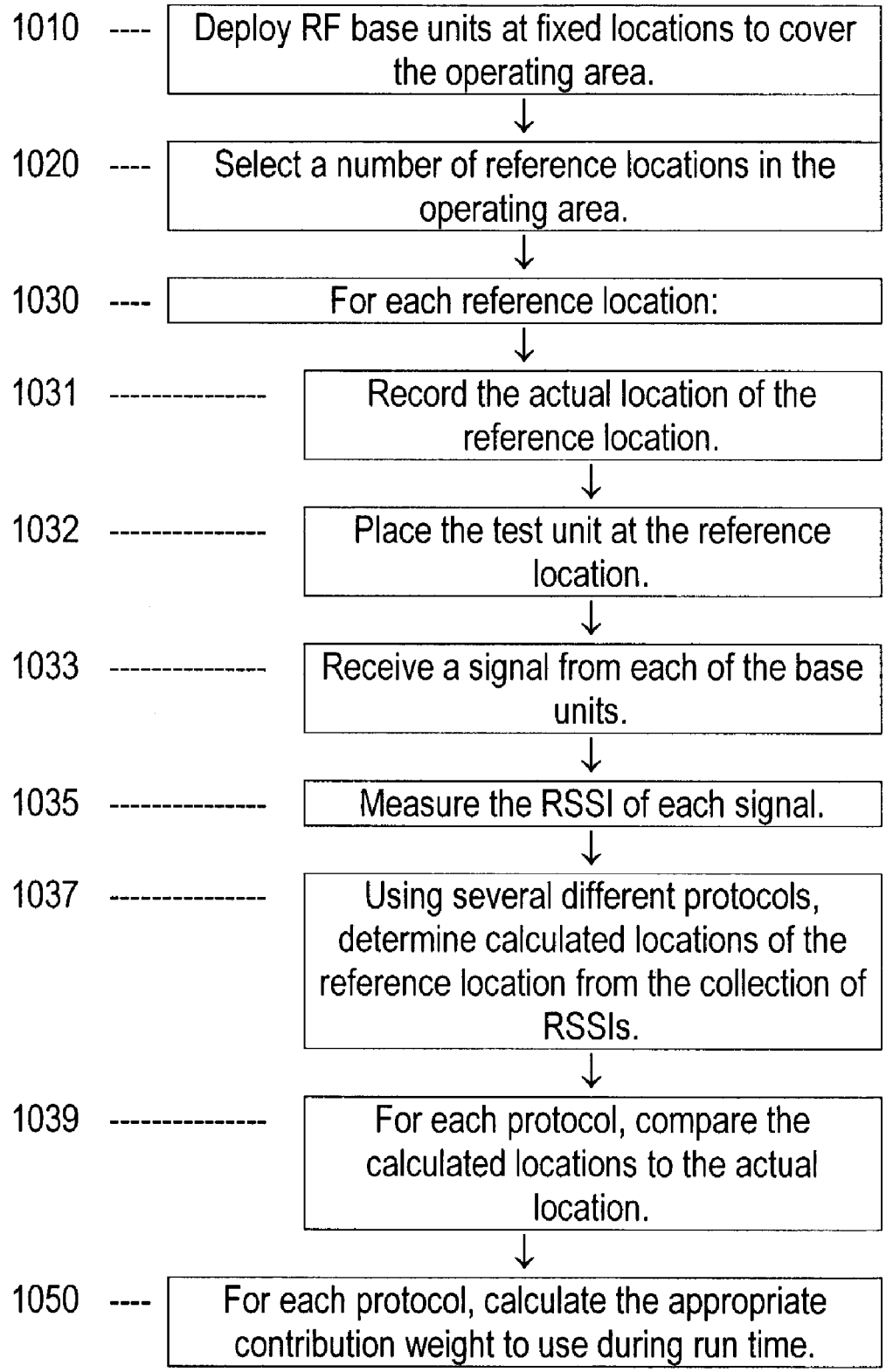
FIG. 10 is a flow diagram of a procedure for compiling reference information on an RF environment.

FIG. 10 is a flow diagram illustrating one embodiment of a method for compiling reference information on the reliability of different protocols for location estimation. In step 1010, the operating area is created when, over time, wireless RF transmitter base units are deployed throughout the area. While base units may come and go over a long period of time, these changes in the environment of the operating area are infrequent enough that over the time scale that a mobile user operates in the area, the environment is substantially static. The mobile user can count on certain transmitting base units being available and, in an average sense, having predictable transmission characteristics, such as signal strength distributions. Thus the RF environment of the operating area can be well characterized by a collection of scattered measurements.

In step 1020, a set of reference locations (test points) are selected throughout the operating area. This selection can be made either in advance or piecemeal, as the reference data is collected. In step 1030, one (or more) test unit is then transported from location to location among the reference locations selected in step 1020. The test unit includes a receiver and appropriate components for analyzing RF signals received from the wireless base units deployed in step 1010. The test unit can be either a regular mobile unit, or a more specialized or more sensitive piece of equipment.

At each of the reference locations, (1031) a record is made of the actual physical location of the reference location, (1032) the test unit is placed at the reference location, (1033) the test unit receives a collection of wireless signals from each of the base units, (1035) the test unit measures the RSSI of the received signals, and (1037) calculates its estimated location from the RSSIs. The estimated locations are preferably calculated according to a variety of protocols, some of which involve only a subset of the available transmitters, and some of which involve different mathematical treatments of the measured RSSIs.

The different protocols are evaluated in step 1039 by comparing the predictions that their estimates give against the actual locations of the reference locations. In response to these evaluations, a database of reference information is calculated in step 1050. This reference information preferably include a series of contributions weights that can be employed later by a mobile unit to intelligently combine its own location estimates.

Sample Procedure for Using Reference Information During Run Time.

Figure 11:
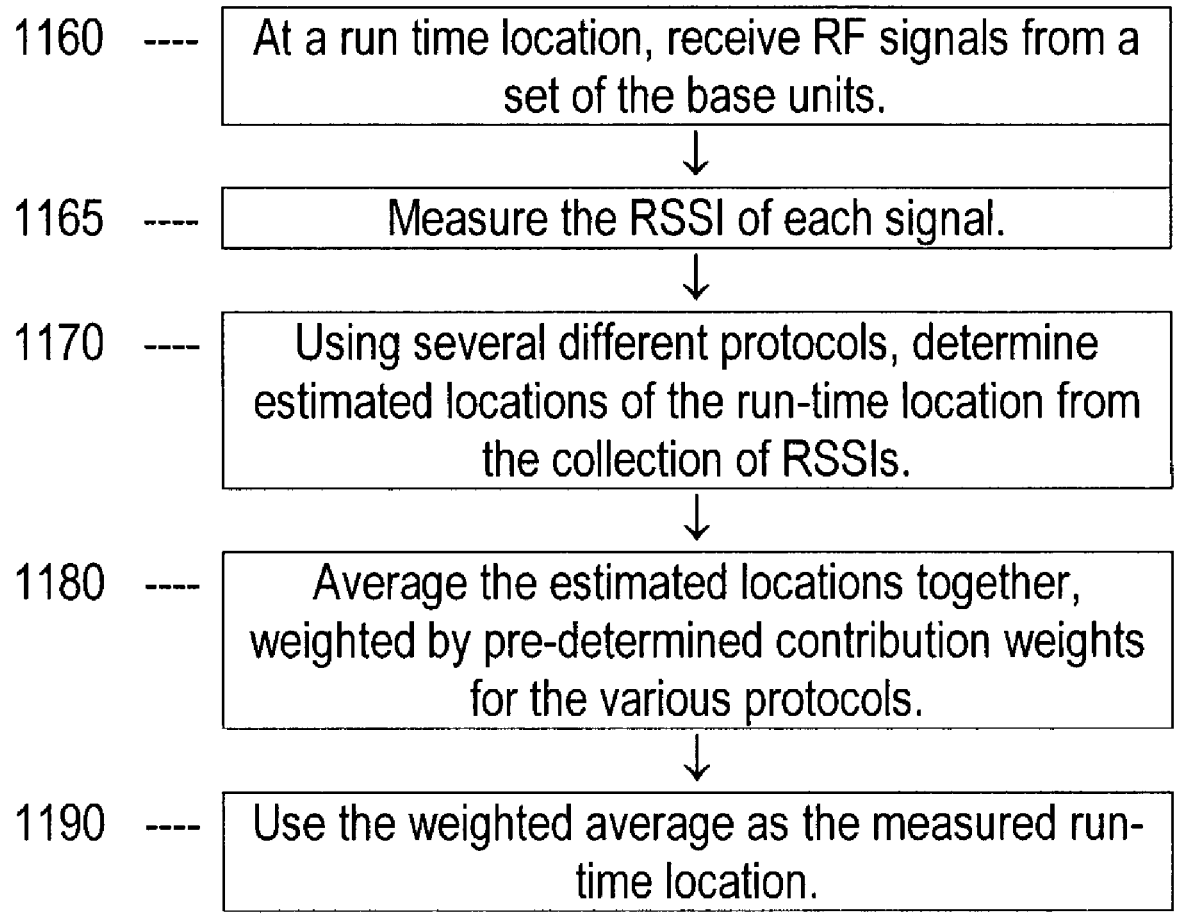
FIG. 11 is a flow diagram for using reference information to locate a receiver in an RF environment.

FIG. 11 is a flow diagram illustrating one embodiment of a method for using reference information on the reliability of different protocols for location estimation. In step 1160, a mobile unit being used in the operating area receives signals from some or all of the base units that transmit into the operating area. The mobile unit measures the RSSI's of the received signals in step 1165. In step 1170, these RSSIs are used to calculate the mobile unit's estimated location in the operating area. The estimated locations are preferably calculated according to a variety of protocols, some of which involve only a subset of the available transmitters, and some of which involve different mathematical treatments of the measured RSSIs. In step 1180, the various location estimates are averaged together, weighted by predetermined contribution coefficients drawn from a set of reference information. The weighted average, which combines the individual estimates, is then used in step 1190 as a refined estimate of the mobile unit's location. The refined estimate can be shown on a display screen of the mobile unit for the benefit of a user and/or passed to a software application on the mobile unit to be used by that application.

While this method is described in reference to RF signals, the techniques herein are readily adaptable to other wireless systems, such as acoustic, sonar, and optical systems.

Enhanced Location Estimation Using Subregions.

Figure 12:
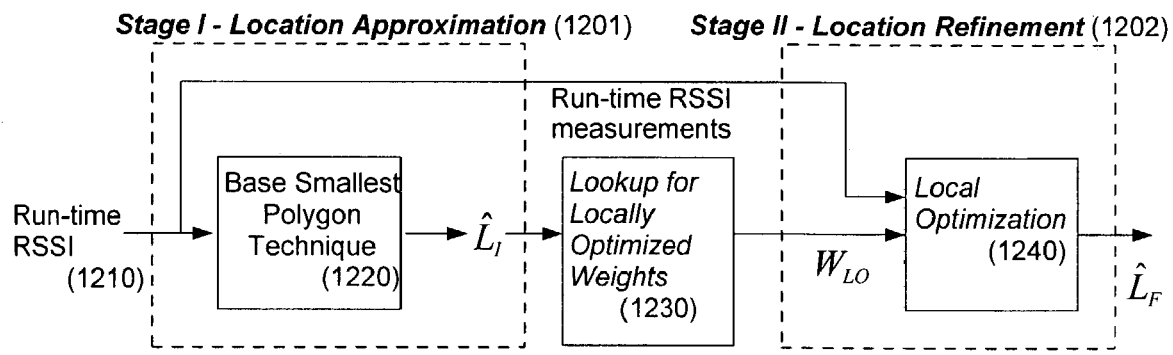
FIG. 12 illustrates a technique for using regionalized reference information to refine a location estimate.

FIG. 12 schematically shows one embodiment of a method for enhancing location estimation using "weight localization," the scheme of revising a location estimate with information received only from nearby base stations. Instead of using a single global set of weights for an entire operating region, this method preferably divides the operating area into subregions and applies locally-optimized weights for each specific subregion. For an operating region deployed over a very large area, weights trained globally may exhibit somewhat locally variable and inconsistent performances if aggregate properties for location estimation vary from one subregion to another. Such variable factors may result from specific settings of structural components, walls, movement paths, and so forth. Although MMSE weight training tries to minimize mean square error for the entire space, there are practical limits to defining an operating area over a large space.

The weight localization method has two stages. The first stage 1201 is a location approximation that is used to retrieve the locally optimized weights ($W_{LO}$ in FIG. 12). Location approximation $\hat{L}_1$ is first obtained from run-time signal characteristics 1210 by utilizing basic triangulation, k-nearest neighbor, smallest polygon technique (1220), or a combination of any two or all three. The role of the location approximation stage is to distinguish among different subregions, in which different sets of weights describe the local environment. A subregion's particular set of weights must be applied for the final location estimate. Thus, once the location approximation stage identifies which subregion an object is positioned in, a specific set of localized weights for that specific subregion can be used.

Basic triangulation, k-nearest neighbor, and smallest polygon techniques can suffice for location approximation purposes. Then, a lookup 1230 follows to retrieve the locally optimized weights of that subregion from a reference library. Finally, the second stage 1202 in the weight localization method refines the location estimate with the locally optimized weights 1240. As shown in FIG. 12, the final location estimate of the two-stage process is $\hat{L}_F$.

Iterative Location Refinement.

Figure 13:
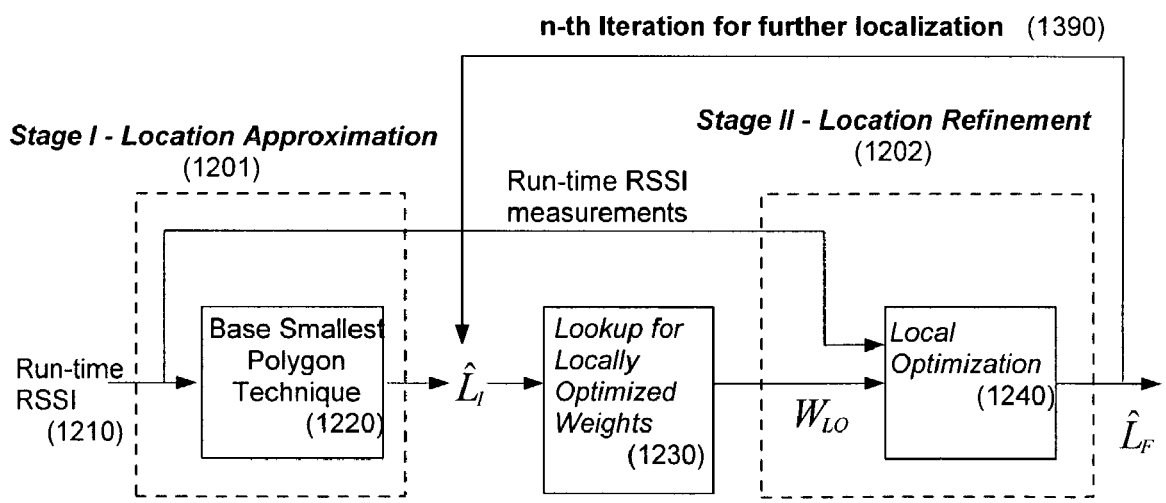
FIG. 13 illustrates a technique for using regionalized reference information to iteratively refine a location estimate.

FIG. 13 depicts an embodiment of yet a further enhancement of the weight localization technique from FIG. 12. By running multiple iterations for location refinement, this further enhancement can enable more precise measurement of a mobile unit's physical position. The n-th iterative location refinement is designed to fit more precisely into the correct sets of locally optimized weights. For this purpose, $\hat{L}_F$ is fed back to the lookup module (at the beginning of location refinement stage) that searches for the locally optimized weights until a revised values of $\hat{L}_F$ is obtained and compared.

The repeated feedback 1390 can be carried out a fixed number of times, such as one repetition or 10 repetitions. Preferably, the repetitions are repeated to seek a convergent value of $\hat{L}_F$. If the value of $\hat{L}_F$ after feeding the previous value into the location refinement stage (i.e. Stage II in FIG. 13) is substantially equivalent to the previous $\hat{L}_F$ then this estimate $\hat{L}_F$ is considered the final location estimate of the n-th iterative location refinement. If they differ, the location refinement stage will be iteratively repeated until the previous and the next estimates are matched.

4. Example of a Mobile Unit

Figure 14:
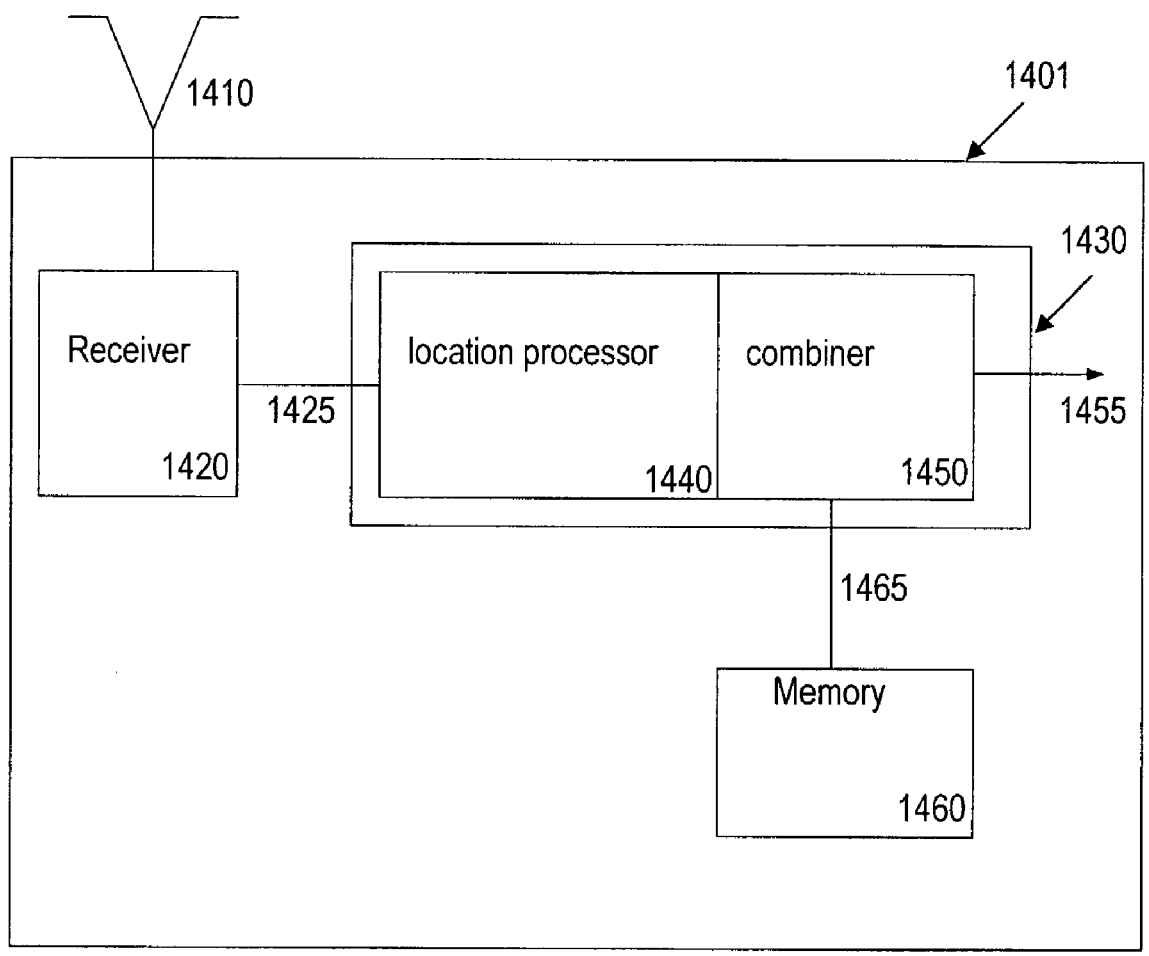
FIG. 14 is a block diagram of a mobile unit configured to determine its position in an RF environment.

FIG. 14 is a block diagram of one embodiment of a mobile unit configured with the ability to determine its physical location. The mobile unit 1401 has a receiver 1420 that receives wireless signals through an antenna 1410 from a variety of available base station transmitters. The receiver is in data communication with a CPU 1430. Characteristics 1425 of the received signals are provided to CPU 1430. In a preferred embodiment of the receiver, the characteristics 1425 passed to CPU 1430 are RSSI signals-digital values that are a function of the signal strengths of the received signals. In alternative embodiments, the characteristics passed to CPU 1430 are time-of-flight measurements that relate the propagation delay from the transmitters that produced the signals received at antenna 1410.

In alternate embodiments of mobile unit 1401, the CPU is replaced or augmented by a digital signal processing unit, a dedicated ASIC, or other circuitry.

Under the control of programming instructions, CPU 1430 acts as a location processor 1440 that makes calculations of the mobile unit's location, based on the measured characteristics of the received signals. These calculations preferably include calculations from at least two techniques from the following: the triangulation technique, the nearest-neighbors technique, the smallest polygon technique, or other techniques for determining a mobile unit's location. Thus, location processor 1440 generates a set of location estimates. In one implementation, one location estimate is generated from each of the techniques used.

Alternatively, the calculations by location processor 1440 can include only one of the above-mentioned techniques, with that one technique applied to signals from different base station transmitters (or from various subsets of the different base station transmitters). Here too, location processor 1440 outputs a set of location estimates. In one implementation, one location estimate is generated for each of the base station transmitters.

In a preferred embodiment, location processor 1440 is configured to generate both (a) a set of location estimates from a variety of estimation techniques and (b) a set of location estimates from a variety of subsets of the available transmitters.

The various location estimates from location processor 1440 are passed to a combiner 1450. Combiner 1450 is also implemented through programming instructions in microprocessor 1430. Alternatively, combiner 1450 can be a separate VLSI circuit or another type of dedicated circuit. Combiner 1450 receives a set of reference information 1465 from a memory 1460 in mobile unit 1401. Reference information 1465 includes data indicative of the comparative reliabilities of the various location estimates that are provided to the combiner. In one embodiment, reference information 1465 is a database of (1) the locations of offline test points where pre-operational signal measurements have been made and (2) RSSI measurements (or other signal characteristics) measured at those test points for various transmitting base stations. The combiner then uses the reference information to calculate a combined or refined location estimate 1455.

In a preferred embodiment, reference information 1465 is a set of weighting coefficients that indicate the reliability of the various location estimates provided to the combiner. The combiner then multiplies each of the location estimates received from location processor 1440 by a corresponding weighting coefficient from reference information 1465. The resulting products are added together, and the combined or refined location estimate 1455 is generated in response to the sum.

The refined location estimate 1455 is useable by other applications in mobile unit 1401 or by a user operating mobile unit 1401. Accordingly, the refined location estimate 1455 is passed to the other applications and/or displayed on a display screen of mobile unit 1401 for the benefit of the user.

It is to be understood that multiple variations, changes and modifications are possible in the aforementioned embodiments of the invention described herein. Although certain illustrative embodiments of the invention have been shown and described here, a wide range of modification, change, and substitution is contemplated in the foregoing disclosure and, in some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

The invention claimed is:

1. A communications unit comprising:
   a receiver circuit configured to receive two or more wireless signals from two or more wireless transmitters;
   a processing unit coupled to the receiver circuit and configured to generate two or more location estimates based on two or more location estimation protocols in response to the two or more wireless signals;
   a digital memory holding reference information on reliabilities of the location estimation protocols; and
   a combiner circuit coupled to the digital memory and to the processing unit, the combiner circuit configured to generate a refined location estimate using the two or more location estimates, and weighting each location estimate according the reliability of the corresponding location estimation protocol in the reference information.

2. The communications unit of claim 1, wherein the location estimates are determined in response to received signal strengths of the wireless signals.

3. The communications unit of claim 1, wherein the location estimates are determined in response to propagation delays of the wireless signals.

4. The communications unit of claim 1, wherein the reference information is derived from a minimum mean square error (MMSE) criterion.

5. The connnunications unit of claim 1, wherein the reference information is predetermined reference information.

6. The communications unit of claim 1, wherein the location estimates include a triangulation-based location estimate.

7. The communications unit of claim 1, wherein the location estimates include a nearest-neighbors-based location estimate.

8. The communications unit of claim 1, wherein the location estimates include a smallest-polygon-based location estimate.

9. The communications unit of claim 1, wherein the location estimates include two or more of: a triangulation-based location estimate, a nearest-neighbors-based location estimate, or a smallest-polygon location estimate.

10. The communications unit of claim 1, wherein the location estimates include a location estimate based on a signal ranging in a wireless communication system.

11. The communications unit of claim 1, wherein the location estimates include a location estimate based on signal ranging in a short range wireless communication system.

12. The communications unit of claim 1, wherein the combiner circuit is implemented in computer-readable program code running on a microprocessor or on a digital signal processor.

13. The communications unit of claim 1, wherein the combiner circuit is a dedicated VLSI circuit.

14. The communications unit of claim 1, wherein the combiner circuit is configured to generate the refined location estimate as a linear combination of the two or more of the location estimates, with relative weights derived from the reference information.

15. The communications unit of claim 1, wherein the location estimates include two or more intermediate location estimates for a triangulation calculation.

16. The communications unit of claim 1, wherein the location estimates include two or more intermediate location estimates for a nearest-neighbors calculation.

17. The communications unit of claim 1, wherein the location estimates include two or more intermediate location estimates for a smallest-polygon calculation.

18. The communications unit of claim 1,
   wherein the processing unit is further configured to generate a preliminary location approximation in response to the wireless signals; and
   wherein the combiner circuit is further configured to generate the refined location estimate in response to the preliminary location approximation and the reference information.

19. The communications unit of claim 18,
   wherein the reference information includes N sets of local reference information corresponding to N local operating regions for the communications unit;

wherein the combiner is configured to select one of the sets of local reference information corresponding to the preliminary location approximation; and wherein the combiner circuit is configured to generate the refined location estimate in response to the selected set of local reference information.

20. A communications unit comprising:

a receiver circuit configured to receive two or more wireless signals from two or more wireless transmitters;

a processing unit coupled to the receiver circuit and configured to generate two or more location estimates in response to the two or more wireless signals;

a digital memory holding reference information on reliabilities of location estimation protocols; and a combiner circuit coupled to the digital memory and to the processing unit, the combiner circuit configured to generate a refined location estimate in response to the two or more location estimates and the reference information;

wherein the location estimates include a triangulation-based location estimate and a nearest-neighbors-based location estimate, and the reference information includes data reflecting the comparative reliability of triangulation estimates and nearest-neighbors estimates.

21. A communications unit comprising:

a receiver circuit configured to receive two or more wireless signals from two or more wireless transmitters;

a processing unit coupled to the receiver circuit and configured to generate two or more location estimates in response to the two or more wireless signals;

a digital memory holding reference information on reliabilities of location estimation protocols; and a combiner circuit coupled to the digital memory and to the processing unit, the combiner circuit configured to generate a refined location estimate in response to the two or more location estimates and the reference information;

wherein the location estimates include two or more intermediate location estimates for a triangulation calculation; and wherein the combiner circuit is configured to generate the refined location estimate as a weighted average of the intermediate location estimates for a triangulation calculation, with relative weights derived from the reference information.

22. A communications unit comprising:

a receiver circuit configured to receive two or more wireless signals from two or more wireless transmitters;

a processing unit coupled to the receiver circuit and configured to generate two or more location estimates in response to the two or more wireless signals;

a digital memory holding reference information on reliabilities of location estimation protocols; and a combiner circuit coupled to the digital memory and to the processing unit, the combiner circuit configured to generate a refined location estimate in response to the two or more location estimates and the reference information;

wherein the location estimates include two or more intermediate location estimates for a nearest-neighbors calculation; and wherein the combiner circuit is configured to generate the refined location estimate as a weighted average of the intermediate location estimates for the nearest-neighbors calculation, with relative weights derived from the reference information.

23. A communications unit comprising:

a receiver circuit configured to receive two or more wireless signals from two or more wireless transmitters;

a processing unit coupled to the receiver circuit and configured to generate two or more location estimates in response to the two or more wireless signals;

a digital memory holding reference information on reliabilities of location estimation protocols; and a combiner circuit coupled to the digital memory and to the processing unit, the combiner circuit configured to generate a refined location estimate in response to the two or more location estimates and the reference information;

wherein the location estimates include two or more intermediate location estimates for a smallest-polygon calculation; and wherein the combiner circuit is configured to generate the refined location estimate as a weighted average of the intermediate location estimates for the smallest-polygon calculation, with relative weights derived from the reference information.

24. A communications unit comprising:

a receiver circuit configured to receive two or more wireless signals from two or more wireless transmitters;

a processing unit coupled to the receiver circuit and configured to generate two or more location estimates in response to the two or more wireless signals;

a digital memory holding reference information on reliabilities of location estimation protocols; and a combiner circuit coupled to the digital memory and to the processing unit, the combiner circuit configured to generate a refined location estimate in response to the two or more location estimates and the reference information;

wherein the processing unit is further configured to generate a preliminary location approximation in response to the wireless signals;

wherein the combiner circuit is further configured to generate the refined location estimate in response to the preliminary location approximation and the reference information;

wherein the reference information includes N sets of local reference information corresponding to N local operating regions for the communications unit;

wherein the combiner is configured to select one of the sets of local reference information corresponding to the preliminary location approximation;

wherein the combiner circuit is configured to generate the refined location estimate in response to the selected set of local reference information; and wherein the combiner is further configured to iteratively:

(1) make a revised selection of local reference information corresponding to the refined location estimate; and (2) further refine the refined location estimate in response to the revised selection of local reference information.

* * * * *